(12) United States Patent
Karimli et al.

(10) Patent No.: US 10,531,461 B1
(45) Date of Patent: Jan. 7, 2020

(54) DEVICE-BASED WIRELESS TRANSMISSION SENSING AND REGULATION FOR CITIZENS BROADBAND RADIO SERVICE

(71) Applicant: T-Mobile USA, Inc., Bellevue, WA (US)

(72) Inventors: Yasmin Karimli, Kirkland, WA (US); Gunjan Nimbavikar, Bellevue, WA (US); Puja Gupta, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/047,989

(22) Filed: Jul. 27, 2018

(51) Int. Cl.
| | |
|---|---|
| *H04W 72/04* | (2009.01) |
| *H04W 72/08* | (2009.01) |
| *G08C 17/02* | (2006.01) |
| *H04W 8/00* | (2009.01) |
| *H04W 76/25* | (2018.01) |
| *H04W 4/70* | (2018.01) |
| *H04W 84/18* | (2009.01) |
| *H04W 88/08* | (2009.01) |

(52) U.S. Cl.
CPC ........ *H04W 72/0453* (2013.01); *G08C 17/02* (2013.01); *H04W 4/70* (2018.02); *H04W 8/005* (2013.01); *H04W 72/085* (2013.01); *H04W 76/25* (2018.02); *H04W 84/18* (2013.01); *H04W 88/08* (2013.01)

(58) Field of Classification Search
CPC ... H04W 72/0453; H04W 4/70; H04W 76/25; H04W 72/085; H04W 8/005; H04W 88/08; H04W 84/18; G08C 17/02
See application file for complete search history.

(56) References Cited

U.S. PATENT DOCUMENTS

| | | |
|---|---|---|
| 2016/0212624 A1 | 7/2016 | Mueck et al. |
| 2017/0055193 A1 | 2/2017 | Mueck et al. |
| 2017/0374557 A1 | 12/2017 | Mueck et al. |
| 2018/0035301 A1 | 2/2018 | Nama et al. |
| 2018/0063844 A1 | 3/2018 | Khoshnevisan et al. |
| 2019/0124659 A1* | 4/2019 | Wang .................... H04W 76/25 |
| 2019/0150134 A1* | 5/2019 | Kakinada ................ H04W 4/70 370/330 |

OTHER PUBLICATIONS

PCT Search Report and Written Opinion dated Oct. 29, 2019 for PCT Application No. PCT/US2019/041317, 12 pages.

* cited by examiner

*Primary Examiner* — Vinncelas Louis
(74) *Attorney, Agent, or Firm* — Lee & Hayes, P.C.

(57) ABSTRACT

Wireless transmission regulation for a frequency band associated with Citizens Broadband Radio Service (CBRS) is described. In an example, a sensor associated with a device, which is configured to operate in the frequency band, can scan at least a portion of the frequency band to generate sensor data indicating at least energy present in the portion of the frequency band. The device can determine, based at least in part on analyzing the sensor data, a presence of another device utilizing the frequency band. The other device can be a priority user having priority access over the device. The device can transmit the sensor data to a base station that is configured to analyze the sensor data and determine how to transmit one or more communications within the frequency band, based at least in part on the sensor data and subscriber information associated with subscriber(s) of a telecommunications service.

20 Claims, 11 Drawing Sheets

500

ACCESS HISTORICAL DATA ASSOCIATED WITH USE OF THE CITIZENS BROADBAND RADIO SERVICE (CBRS) BAND
502

DETERMINE, BASED AT LEAST IN PART ON THE HISTORICAL DATA, CHANNEL(S) OF A PLURALITY OF CHANNELS THAT ARE TYPICALLY OCCUPIED BY PRIORITY USER(S)
504

SCAN AT LEAST A PORTION OF THE CBRS BAND THAT EXCLUDES THE CHANNEL(S) THAT ARE TYPICALLY OCCUPIED BY PRIORITY USER(S) PRIOR TO SCANNING OTHER PORTION(S) OF THE CBRS BAND ASSOCIATED WITH THE CHANNEL(S) THAT ARE TYPICALLY OCCUPIED BY PRIORITY USER(S)
506

FIG. 5

DEVICE-BASED WIRELESS TRANSMISSION SENSING AND REGULATION FOR CITIZENS BROADBAND RADIO SERVICE

BACKGROUND

The Citizens Broadband Radio Service (CBRS) enables shared wireless broadband use of the 3550-3700 megahertz (MHz) band (3.5 gigahertz (GHz) band). Historically, a portion of the CBRS band has been used by the United States Navy, satellite service providers, and utilities. However, the CBRS band has recently been availed for new mobile uses.

The Federal Communications Commission has implemented various rules to provide a number of tangible benefits for consumers, businesses, and government users. For instance, the rules provide protections to incumbent users from harmful interference by other users. Further, the rules avail additional spectrum for flexible wireless broadband use, which will lead to improved broadband access and performance for consumers. Moreover, the rules enable deployment of wireless broadband in industrial applications (e.g., advance manufacturing, energy, healthcare, etc.), which will support innovation and growth.

CBRS is governed by a three-tiered spectrum authorization framework to accommodate a variety of commercial uses on a shared basis with incumbent users of the 3.5 GHz band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. The FCC rules protect such users from harmful interference from Priority Access and General Authorized Access users. That is, Incumbent Access users have priority access to the 3.5 GHz band. Priority Access users are granted access to the 3.5 GHz band via a Priority Access License assigned using competitive bidding within the 3550-3650 MHz portion of the 3.5 GHz band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, General Authorized Access users can opportunistically operate on unused Priority Access channels.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example process for determining portion(s) of the CBRS band to scan based on historical data, as described herein.

DETAILED DESCRIPTION

Figure 1:
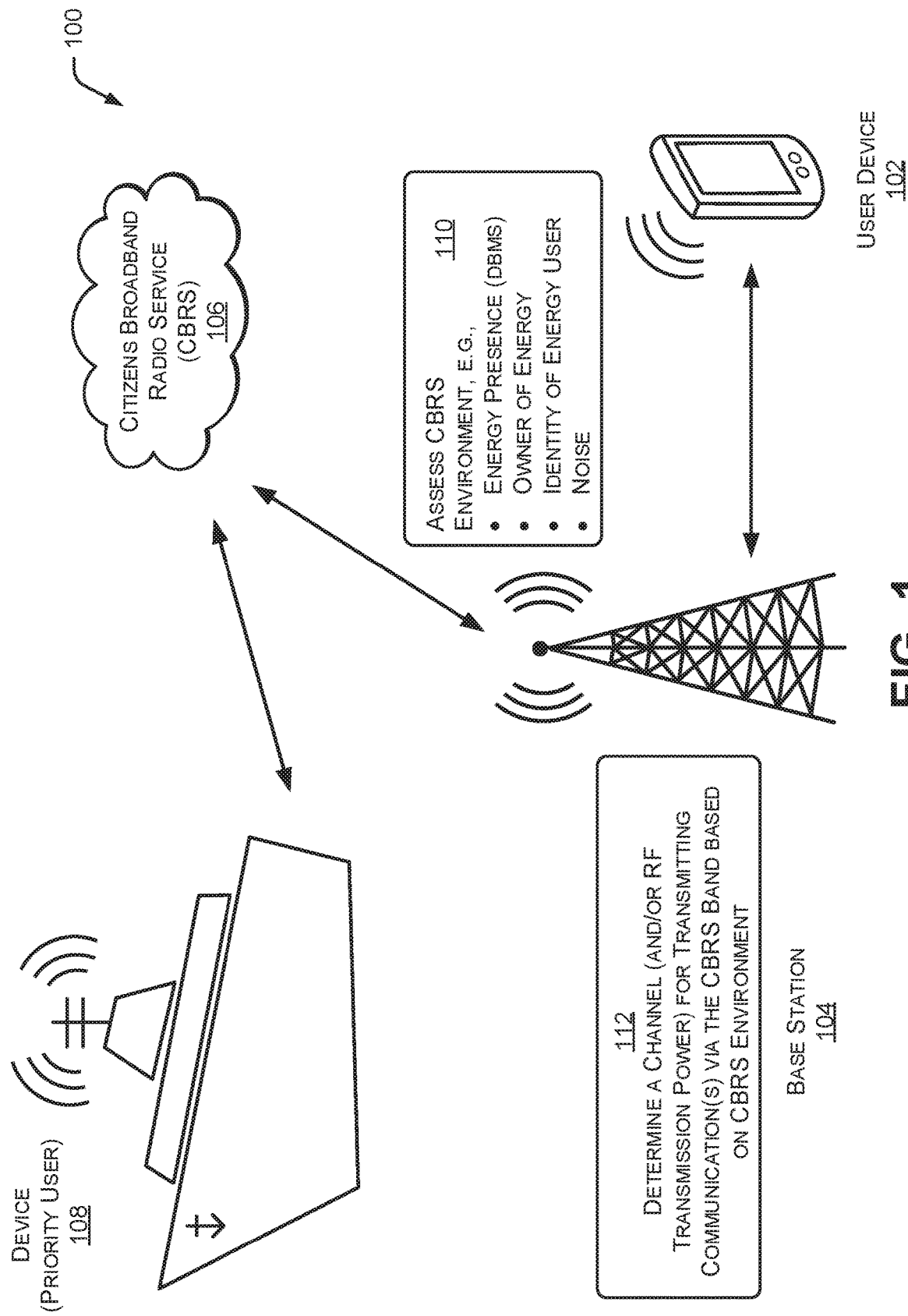
FIG. 1 illustrates an environment within which access to the Citizens Broadband Radio Service (CBRS) band is regulated, as described herein.

This disclosure describes regulating access to the Citizens Broadband Radio Service (CBRS). The CBRS enables shared wireless broadband use of the 3550-3700 megahertz (MHz) band (3.5 gigahertz (GHz) band), hereinafter the "CBRS band." CBRS is governed by a three-tiered spectrum authorization framework to accommodate a variety of commercial uses on a shared basis with incumbent users of the CBRS band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. Such users are protected from harmful interference from Priority Access and General Authorized Access users. That is, Incumbent Access users have priority access to the CBRS band. Priority Access users are granted access to the CBRS band via a Priority Access License that will be assigned using competitive bidding within the 3550-3650 MHz portion of the CBRS band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, General Authorized Access users can opportunistically operate on unused Priority Access channels.

Techniques described herein are directed to regulating access to the CBRS to enable mobile device users to utilize the CBRS band while ensuring that use by priority users is not subjected to harmful interference. For the purpose of this discussion, "priority users" can refer to Incumbent Access users and/or Priority Access users. In at least one example, sensor(s) configured to operate in the CBRS band can scan at least a portion of the CBRS band to generate sensor data indicating at least energy present (e.g., energy levels present (decibels/milliwatt (dbms)) in the portion of the CBRS band. That is, in at least one example, such sensor(s) can be leveraged to "listen" to the environment of the CBRS band prior to transmitting communications via the CBRS band (e.g., on behalf of non-priority users) to ensure that such transmissions do not interfere with use of the CBRS band by priority users. The sensor(s) can be associated with user equipment (UE), such as mobile devices, and/or base stations. In at least one example, the sensor(s) can scan the CBRS band to generate data which can be used to determine whether energy is present (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc.

In at least one example, UE can utilize the sensor data to determine a device radio frequency (RF) transmission power for transmitting communications within the CBRS band. Additionally or alternatively, a base station can utilize the sensor data to determine a channel for transmitting communications within the CBRS band. For instance, in some examples, the base station can determine, based on the sensor data, that a priority user is using a channel of the CBRS band and, as a result, can select another channel of the CBRS band for transmitting communications. In other examples, the base station can determine, based on the sensor data, that a priority user is using a channel of the CBRS band and, as a result, can transmit data via the same channel utilizing channel sharing techniques, as described herein. In some examples, the base station can utilize the sensor data to determine a RF transmission power for transmitting communications within the CBRS band. Additionally or alternatively, in some examples, the base station can utilize the sensor data to determine the timing of "listening" prior to transmitting communications.

Techniques described herein offer a number of tangible benefits for users of the CBRS band. For instance, the techniques described herein enable telecommunications service providers (e.g., General Authorized Access users) to maximize locations where base stations can be installed by ensuring protections to incumbent users from harmful interference (i.e., ensuring compliance with the Federal Communication Commission rules). Due to the high usage of the CBRS band by the United States Navy, many telecommunications service providers are avoiding installing base stations near coastlines or other areas where use by the United States Navy is expected. This significantly limits the usefulness of the CBRS band for customers (e.g., subscribers) of such telecommunications service providers. Techniques described herein enable such telecommunications service providers to install base stations near coastlines or other areas where United States Navy use is expected all while ensuring that the United States Navy and other priority users can use the CBRS band without harmful interference. Further, techniques described herein avail additional spectrum for flexible wireless broadband use, which can lead to improved broadband access and performance for consumers, as intended by the recent availing of the CBRS band for shared use.

FIG. 1 illustrates an environment 100 within which access to the CBRS is regulated, as described herein. As illustrated in the environment 100, a user device 102 is capable of communicating with a base station 104. As described below, base stations (also known as cell sites or cell towers) can be associated with antennae and other electronic communications equipment (e.g., transceivers, digital signal processors, control electronics, a GPS receiver, etc.) to create a cell in a cellular network. The base station 104 is capable of communicating with the user device 102 and/or one or more other devices via networks, such as via the CBRS 106.

In at least one example, other devices can additionally communicate via the CBRS 106. For instance, device 108 is illustrated in FIG. 1. For the purpose of this discussion, device 108 can be associated with a priority user, such as an Incumbent Access user and/or a Priority Access user, as described above. For illustrative purposes, the device 108 is shown in association with a ship, such as a ship used by the United States Navy.

In at least one example, the user device 102 and/or the base station 104 can include one or more sensors for scanning the CBRS band. In some examples, the one or more sensors associated with the user device 102 and/or the base station 104 can scan the CBRS band at a particular frequency, prior to a transmission of a communication, etc. The one or more sensors can be configured to operate in the CBRS band and can determine sensor data indicative of the environment associated with the CBRS band, as illustrated in block 110. For instance, the sensor data can indicate whether energy is present in the CBRS band (e.g., energy levels present (dbms)), an owner of the energy (e.g., who generated the energy, a source of the energy, etc.), an identity of an entity utilizing the energy, a channel and/or channel(s) associated with the energy, noise present in the CBRS band (e.g., a level of noise associated with the CBRS band), etc.

In some examples, the user device 102 can utilize the sensor data to determine whether to transmit in the CBRS band and/or a RF transmission power at which to transmit in the CBRS band. In additional or alternative examples, the user device 102 can transmit sensor data to the base station 104 for device-assisted regulation. The base station 104 can utilize the sensor data received from the user device 102 and/or sensor data determined by the base station 104, and can determine a channel (and/or RF transmission power) for transmitting communication(s) via the CBRS band, as illustrated in block 112. Additional details are described below with respect to determining a channel and otherwise regulating access to the CBRS.

FIG. 1 includes but one example of how techniques described herein can be implemented. Of course, in additional or alternative examples, the device 108 can be associated with any other priority user (e.g., Incumbent Access user or Priority Access user).

Figure 2:
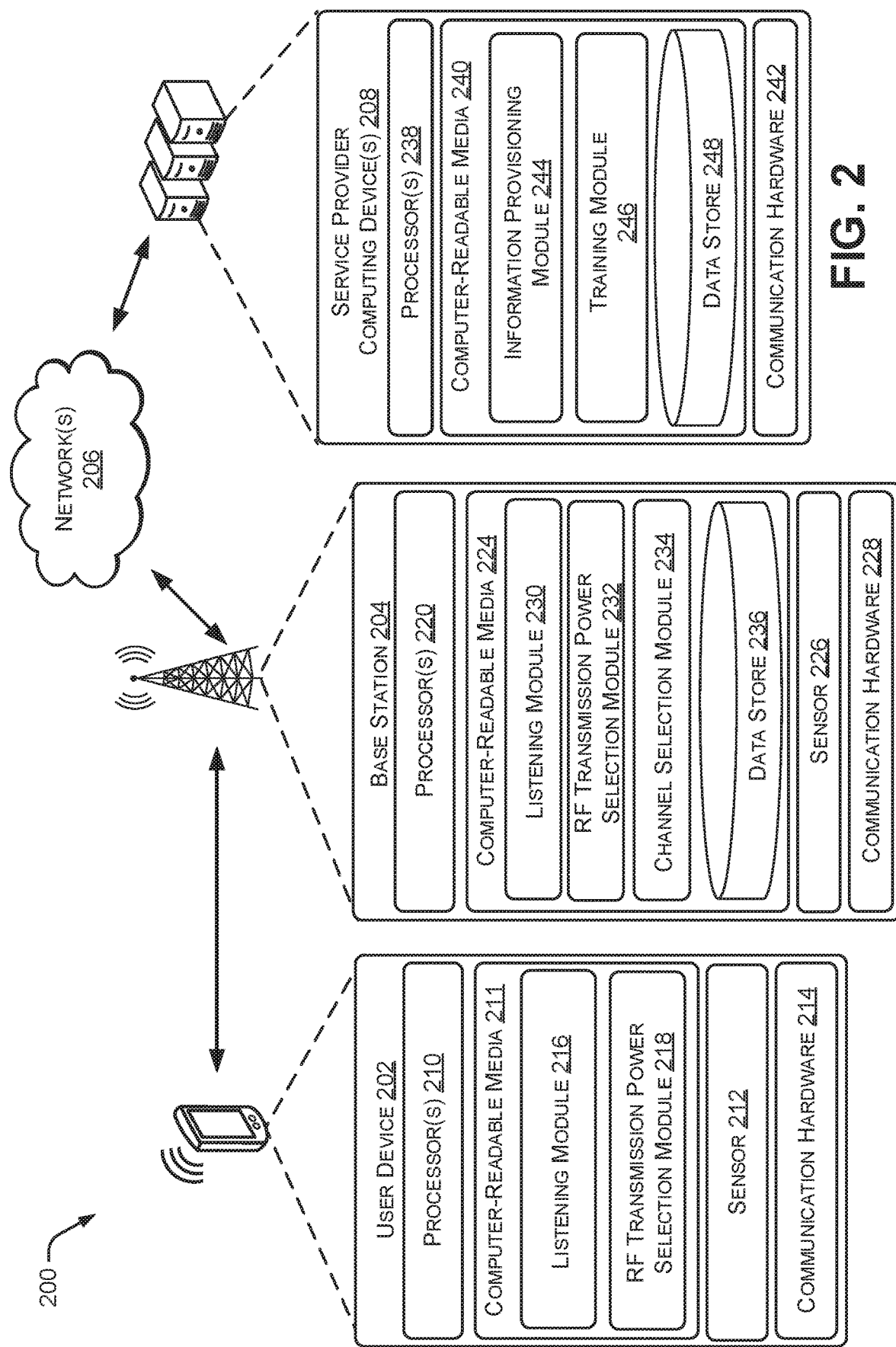
FIG. 2 illustrates a system for regulating access to the CBRS band, as described herein.

FIG. 2 illustrates a system 200 for regulating access to the CBRS, as described herein. In at least one example, the system 200 can include a user device 202 which is capable of communicating with a base station 204. The user device 202 can correspond to the user device 102 described above with reference to FIG. 1, and the base station 204 can correspond to the base station 104 described above with reference to FIG. 1. The base station 204 can communicate with the user device 202 and/or one or more other devices via network(s) 206 (e.g., cellular network(s), wireless network(s), etc.), which can be associated with the CBRS. In at least one example, the base station 204 can additionally communicate with service provider computing device(s) 208 via the network(s) 206. In at least one example, the service provider computing device(s) 208 can be associated with a telecommunications service provider providing a telecommunications service to which one or more subscribers subscribe.

In at least one example, the user device 202 can correspond to UE including, but not limited to, a smart phone, a personal digital assistant, a netbook, a laptop computer, a smart appliance, Internet of Things (IoT) devices and/or another electronic device that is capable of transmitting or receiving audio, video, and/or data via the network(s) 206 (e.g., cellular network(s), wireless network(s), etc.). In at least one example, the user device 202 can include processor(s) 210, computer-readable media 211, a sensor 212, and communication hardware 214.

The processor(s) 210 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 210 can execute one or more modules and/or processes to cause the user device 202 to perform a variety of functionalities, as set forth above and explained in further detail in the following disclosure. Additionally, each of the processor(s) 210 can possess its own local memory, which also can store program modules, program data, and/or one or more operating systems.

Depending on the exact configuration and type of the user device 202, the computer-readable media 211, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 211 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the user device 202. Any such non-transitory computer-readable media can be part of the user device 202.

In contrast, communication media includes computer readable instructions, data structures, program modules, or other data in a modulated data signal, such as a carrier wave, or other transmission mechanism. As defined herein, computer storage media does not include communication media.

The computer-readable media 211 can include one or more modules and data structures including, for example, a listening module 216 and a RF transmission power selection module 218. The one or more modules and data structures can be in the form of stand-alone applications, productivity applications, an operating system component, or any other application or software module configured to perform operations as described herein.

The listening module 216 can assess the environment of at least the CBRS band. In at least one example, the user device 202 can include a sensor 212, which can include a spectrum analyzing device configured to analyze the CBRS band. In at least one example, the sensor 212 can be configured to detect energy that is present in the CBRS band. For instance, the sensor 212 can scan the CBRS band to generate sensor data indicating whether energy is present (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. In at least one example, the sensor 212 can be configured to generate sensor data indicating which channel(s) are being used for transmitting data and/or a load associated with individual channel(s) (e.g., channel loading). Such sensor data can represent the radio environment particular to the CBRS band. The sensor 212 can provide such sensor data to the listening module 216 for analyzing.

In at least one example, the listening module 216 can send an instruction to the sensor 212 instructing the sensor 212 to scan the CBRS band. In some examples, the instruction can be sent at a particular frequency. In other examples, the instruction can be sent in association with a data transmission (e.g., a communication), for instance before the data transmission is transmitted to the base station 204. Responsive to sending the instruction, the listening module 216 can receive sensor data and can analyze the sensor data to determine the radio environment associated with the CBRS band. Sensor data can include, but is not limited to, an indication of whether energy is present (e.g., energy levels present (dbms)), an indication of who generated the energy (e.g., an owner of the energy, a source of the energy, another operator, etc.), an identity of an entity using the energy, noise associated with the CBRS band (e.g., a level of noise associated with the CBRS band), etc. In some examples, sensor data can identify which channels within the CBRS band are occupied, and to what extent such channels are occupied (e.g., channel loading). For the purpose of this discussion, the "extent" to which a channel is occupied can refer to an amount of channel bandwidth that is being used by a data transmission (e.g., communication).

In at least one example, the listening module 216 can determine the temporal frequency for sending the instruction based on one or more characteristics. For instance, in at least one example, the listening module 216 can determine a time, a date, and/or a geolocation associated with the user device 202, and can determine a temporal frequency for sending the instruction based on the time, the date, and/or the geolocation. In some examples, the listening module 216 can utilize machine learned models to determine the temporal frequency for sending the instruction. As a non-limiting example, the user device 202 can be located near a United States Naval Base. As a result, the listening module 216 can determine to send the instruction at a higher temporal frequency (e.g., more scans per period of time) than if the user device 202 was located away from a United States Naval Base. Or, the listening module 216 can adjust the temporal frequency (e.g., reduce the temporal frequency) in which such an instruction is sent based on a date being associated with a time of the year where United States Naval ships are known to be at sea. As another example, the listening module 216 can utilize historical data to determine that a channel is typically very clear (e.g., unoccupied) and can enter a power-saving mode which reduces the number of scans (e.g., reducing the temporal frequency at which instruction(s) are sent).

Furthermore, in some examples, the listening module 216 can determine the frequency for sending the instruction based on a power level of a power source (e.g., battery, etc.) of the user device 202. In examples where the power level is determined to be below a threshold, the listening module 216 can decrease the frequency with which it sends the instruction to the sensor 212 (thereby conserving power consumption).

Managing the temporal frequency at which the user device 202 scans the CBRS band can reduce power consumption and compute. That is, intelligently adjusting the temporal frequency at which the sensor 212 scans the CBRS band can reduce power consumption (by reducing the energy required to assess the CBRS band) and reduce compute (by reducing the resources required to assess the CBRS band).

In some examples, the listening module 216 may not send an instruction to the sensor 212. In such examples, the sensor 212 can push sensor data to the listening module 216. For instance, in some examples, the sensor 212 can push sensor data to the listening module 216 at a particular frequency, in near-real time, etc.

In at least one example, the listening module 216 can transmit sensor data and/or representations thereof to the base station 204. The base station 204 can leverage the sensor data and/or representations thereof for determining how to transmit communications as described below. In some examples, responsive to determining that the power level is below a threshold, the listening module 216 can send a notification to the base station 204 indicating that the power level is below a threshold. In such examples, the base station 204 can receive the notification and determine that it is responsible for assessing the radio environment of the CBRS band and determining how to transmit communications in such a radio environment. That is, in some examples, the user device 202 can provision sensor data to the base station 204 for a device-assisted channel and/or RF transmission power selection process. However, if the power level of the user device 202 is below a threshold, the user device 202 can inform the base station 204, and the base station 204 can select channel(s) and/or RF transmission power without assistance from the user device 202.

The RF transmission power selection module 218 can determine a RF transmission power for transmitting communications via the CBRS band. For the purpose of this discussion, a communication can comprise one or more bits and/or bytes of data that can be transmitted from a first device to a second device. The one or more bits and/or bytes of data can represent voice communications, video communications, text communications, etc. The RF transmission power selection module 218 can utilize sensor data received from the sensor 212 to determine a RF transmission power for transmitting a communication. In at least one example, if the sensor data indicates that another device is present (e.g., using a channel of the CBRS band) and that the device is a priority user, the RF transmission power selection module 218 can determine whether to transmit a communication. If the RF transmission power selection module 218 determines to transmit a communication, the RF transmission power selection module 218 can determine a RF transmission power for transmitting the communication.

In at least one example, the RF transmission power selection module 218 can transmit an indication identifying the RF transmission power at which the user device 202 is transmitting to the base station 104. In some examples, the RF transmission power can be too low, such that the base station 204 cannot hear the user device 202. That is, in some examples, the RF transmission power may be below a threshold and the base station 204 may not be able to hear the user device 202. In at least one example, the user device 202 can wait a period of time before re-transmitting the indication. If, after a predetermined number of attempts to transmit the indication and/or a lapse of a predetermined period of time, the RF transmission power selection module 218 does not receive a response from the base station 204, the RF transmission power selection module 218 can increase the RF transmission power and can transmit an indication of the new RF transmission power to the base station 204.

In at least one example, responsive to transmitting the indication of the RF transmission power to the base station 204, the user device 202 can receive a response, which can include a channel assignment for transmitting a communication. As such, the user device 202 can transmit a communication, at the RF transmission power selected and via the channel prescribed by the base station 204.

In some examples, the RF transmission power selection module 218 can receive an instruction from the base station 204 that specifies the RF transmission power. In such examples, the RF transmission power selection module 218 can receive the instruction and adjust the RF transmission power appropriately.

As described above, the sensor 212 can include a spectrum analyzing device configured to analyze the CBRS band. In at least one example, the sensor 212 can scan the CBRS band to determine information representative of the radio environment particular to the CBRS band (e.g., sensor data). The sensor 212 can provide such sensor data to the listening module 216 for analyzing. In at least one example, the sensor 212 can scan the CBRS band responsive to receiving an instruction from the listening module 216 and can provide sensor data to the listening module 216 responsive to receiving the instruction.

In at least one example, the sensor 212 can additionally include one or more modules and data structures (e.g., computer-readable instructions, etc.) that, when executed by one or more processors, cause the one or more processors to send and/or receive instructions and/or information and, in some examples, make decisions and/or determinations with respect to timing and/or prioritization of channel scanning.

In some examples, the sensor 212 can scan each channel of the CBRS band individually. In at least one example, the sensor 212 can scan individual channels in parallel or serially. In other examples, the sensor 212 can scan two or more channels of the CBRS band together and then parse the sensor data to determine which data corresponds to individual channels.

In at least one example, the sensor 212 can utilize historical data to determine how to scan the channels of the CBRS band. For instance, in at least one example, the sensor 212 can determine, from historical data, that priority users typically use a particular channel. That is, the sensor 212 can determine, based on the historical data, a likelihood that a particular channel is occupied by a priority user. Based on determining that the likelihood is greater than a threshold, the sensor 212 can determine not to scan the particular channel, or to scan the particular channel after scanning one or more other channels. In some examples, the sensor 212 can utilize machine learned models to selectively determine which channels to scan and/or an order for scanning such channels. Or, the sensor 212 can determine, from sensor data, that a priority user is using a particular channel. Accordingly, the sensor 212 can determine not to scan the particular channel in a subsequent scan, or to scan the particular channel after scanning one or more other channels.

In some examples, the sensor 212 can receive an instruction from the listening module 216 which includes instructions on how to scan the CBRS band (e.g., frequency and/or channel(s)). In such an example, the listening module 216 can utilize historical data to selectively determine which channels to scan and/or the order for scanning such channels.

As described above, the sensor 212 can determine sensor data indicative of a power level associated with the user device 202. For instance, the sensor 212 can determine a remaining power level associated with a power source of the user device 202, such as a battery. In some examples, the sensor 212 can additionally or alternatively determine sensor data indicating a geolocation of the user device 202.

While a single sensor is shown and described, the user device 202 can include any number of sensors.

The communication hardware 214 provides wireless UE capabilities, such as connecting to a base station, such as base station 204, associated with a cellular network, a Wi-Fi network, or other wireless networks (e.g., network(s) 206). In at least one example, the communication hardware 214 can include radio hardware, which can include or be incorporated into processors, ASICs, programmable circuits such as FPGAs, or in other ways. In at least one example, the radio hardware can be capable of operating in the CBRS band.

As described above, the user device 202 can communicate with the base station 204. Base stations (also known as cell sites or cell towers) can be associated with antennae and other electronic communications equipment (e.g., transceivers, digital signal processors, control electronics, a GPS receiver, etc.) to create a cell in a cellular network. In at least one example, the base station 204 can include processor(s) 220, computer-readable media 224, a sensor 226, and communication hardware 228. For the purpose of this discussion, the processor(s) 220 and the computer-readable media 224 can have same or similar configurations and perform same or similar functions as the processor(s) 210 and the computer-readable media 211, respectively, as described above.

The computer-readable media 224 can include one or more modules and data structures including, for example, a listening module 230, a RF transmission power selection module 232, a channel selection module 234, and a data store 236. The one or more modules and data structures can be in the form of stand-alone applications, productivity applications, an operating system component, or any other application or software module configured to perform operations as described herein.

The listening module 230 can assess the environment of at least the CBRS band. In at least one example, the base station 204 can include a sensor 226, which can include a spectrum analyzing device configured to analyze the CBRS band. In at least one example, the sensor 226 can be configured to detect energy that is present in the CBRS band. For instance, the sensor 226 can scan the CBRS band to generate sensor data indicating whether energy is present (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. In at least one example, the sensor 226 can be configured to generate sensor data indicating which channel(s) are being used for transmitting data and/or a load associated with individual channel(s) (e.g., load balancing). Such sensor data can represent the radio environment particular to the CBRS band. The sensor 212 can provide such sensor data to the listening module 216 for analyzing. That is, the sensor 226 can have a same or similar structure and perform the same or similar functions as the sensor 212, described above with reference to the user device 202.

In at least one example, the listening module 230 can send an instruction to the sensor 226 instructing the sensor 226 to scan the CBRS band. In some examples, the instruction can be sent at a particular frequency. In other examples, the instruction can be sent in association with a delivery of a data transmission (e.g., a communication). Responsive to sending the instruction, the listening module 230 can receive sensor data and can analyze the sensor data to determine the radio environment associated with the CBRS band. Sensor data can include, but is not limited to, an indication of whether energy is present (e.g., energy levels present (dbms)), an indication of who generated the energy (e.g., an owner of the energy, a source of the energy, another operator, etc.), an identity of an entity using the energy, noise associated with the CBRS band (e.g., a level of noise associated with the CBRS band), etc. In some examples, sensor data can identify which channels within the CBRS band are occupied, and to what extent such channels are occupied (e.g., channel loading).

In at least one example, the listening module 230 can determine the temporal frequency for sending the instruction based on one or more characteristics. For instance, in at least one example, the listening module 230 can determine a time, a date, and/or a geolocation associated with the base station 204, and can determine a temporal frequency for sending the instruction based on the time, the date, and/or the geolocation. In some examples, the listening module 230 can utilize machine learned models to determine the temporal frequency for sending the instruction. As a non-limiting example, the base station 204 can be located near a United States Naval Base. As a result, the listening module 230 can determine to send the instruction at a higher temporal frequency than if the base station 204 was located away from a United States Naval Base. Or, the listening module 216 can adjust the temporal frequency (e.g., reduce the temporal frequency) in which such an instruction is sent based on a date being associated with a time of the year where United States Naval ships are known to be at sea. As another example, the listening module 216 can utilize historical data to determine that a channel is typically very clear (e.g., unoccupied) and can reduce the number of scans (e.g., reducing the temporal frequency instruction(s) are sent) accordingly. As described above, managing the temporal frequency at which the base station 204 scans the CBRS band can reduce power consumption and compute. That is, intelligently adjusting the temporal frequency at which the sensor 226 scans the CBRS band can reduce power consumption (by reducing the energy required to assess the CBRS band) and reduce compute (by reducing the resources required to assess the CBRS band).

In some examples, the listening module 230 may not send an instruction to the sensor 226. In such examples, the sensor 226 can push sensor data to the listening module 230. For instance, in some examples, the sensor 226 can push sensor data to the listening module 230 at a particular frequency, in near-real time, etc.

Moreover, in at least one example, the listening module 230 can send an instruction to the user device 202 which instructs the user device 202 to then instruct the sensor 212 to scan the CBRS band. That is, in some examples, the listening module 230 can send instructions to scan the CBRS band to the sensor 226 on the base station 204 and/or the user device 202 (and corresponding sensor 212). The timing of the sending of such instructions can be determined as described above.

Furthermore, as described above, in at least one example, the listening module 216 associated with the user device 202 can transmit sensor data and/or representations thereof to the base station 204. In at least one example, the listening module 230 associated with the base station 204 can aggregate the sensor data and/or representations thereof received from the user device 202 with sensor data and/or representations thereof received from other user devices (not pictured in FIG. 2) to generate aggregated sensor data. In some examples, the aggregated sensor data can additionally or alternatively include sensor data from the sensor 226. The aggregated sensor data can be used for determining how to transmit communications as described below.

In at least one example, the RF transmission power selection module 232 can determine a RF transmission power for transmitting communications via the CBRS band. The RF transmission power selection module 232 can utilize sensor data received from the sensor 226 (and/or one or more user devices) to determine a RF transmission power for transmitting a communication. In at least one example, if the sensor data indicates that another device is present (e.g., using a channel of the CBRS band) and that the device is a priority user, the RF transmission power selection module 232 can determine whether to transmit a communication in the CBRS band. If the RF transmission power selection module 232 determines to transmit via the CBRS band, the RF transmission power selection module 232 can select a reduced RF transmission power for transmitting the RF transmission power selection module 232. In such examples, the RF transmission power selection module 232 can transmit an indication of the RF transmission power to a user device, such as user device 202.

As described above, in some examples, the user device 202 can determine the RF transmission power and can send an indication to the base station 204 of the RF transmission power. In some examples, the RF transmission power can be too low such that the base station 204 cannot hear the user device 202. That is, in some examples, the RF transmission power may be below a threshold and the base station 204 may not be able to hear the user device 202. As described above, in at least one example, the user device 202 can wait a period of time before re-transmitting the indication. In at least one example, responsive to receiving the indication of the RF transmission power from the user device 202, the base station 204 can transmit a communication at the prescribed RF transmission power.

The channel selection module 234 can select a channel for transmitting one or more communications. In at least one example, the channel selection module 234 can leverage the sensor data to determine which channel to use for transmitting one or more communications. That is, the channel selection module 234 can utilize the sensor data to determine how to broadcast one or more communications.

In at least one example, the channel selection module 234 can analyze the sensor data and can determine that the CBRS band is clear. That is, the sensor data can indicate that no energy is present or, that any energy that is present, is below a threshold such that it cannot be or is not detected. In such an example, the channel selection module 234 can select a channel in the CBRS band for transmitting one or more communications. In an example where the sensor data is associated with a particular channel or set of channels, the channel selection module 234 can select the particular channel or any channel within the set of channels. The channel selection module 234 cannot select a channel unless it has first "listened" to such a channel. That is, the channel selection module 234 cannot select a channel for which it does not have sensor data.

In at least one example, the channel selection module 234 can analyze the sensor data and can determine that at least a portion of the CBRS band is occupied by another device. In such an example, the channel selection module 234 can analyze the sensor data to determine how much energy is present in the CBRS band (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. Furthermore, in at least one example, the channel selection module 234 can determine which channel(s) are occupied and extent to which such channel(s) are occupied (e.g., channel loading) based at least in part on the sensor data. The channel selection module 234 can classify the other device based on the sensor data. For instance, the channel selection module 234 can determine whether the other device is associated with a priority user (e.g., Incumbent Access user or Priority Access user). In some examples, the channel selection module 234 can further classify the other device, for instance, as being associated with the United States Navy or Federal Satellite Service, etc.

In at least one example, if the detected device (e.g., the other device) is not a priority user, the channel selection module 234 can select a channel in the CBRS band for transmitting one or more communications. In an example where the sensor data is associated with a particular channel or set of channels, the channel selection module 234 can select the particular channel or any channel within the set of channels. The channel selection module 234 cannot select a channel unless it has first "listened" to such a channel. That is, the channel selection module 234 cannot select a channel for which it does not have sensor data.

In an additional or alternative example, the detected device (e.g., the other device) may be a priority user. In some examples, the channel selection module 234 can transmit a communication via a same channel that is occupied by the priority user utilizing channel sharing. For instance, in at least one example, responsive to determining that the other device is a priority user that is using a particular channel, the channel selection module 234 can also use the particular channel after listening immediately prior to transmitting. That is, the channel selection module 234 can send a request to the listening module 230 to listen to the CBRS environment (via one or more sensors). The listening module 230 can send an instruction to the sensor 226 and/or the user device 202 to scan the CBRS environment. The listening module 230 can receive the sensor data and analyze the sensor data. The channel selection module 234 can leverage the output to determine whether sensor data associated with the particular channel indicates that the particular channel is occupied at the time of listening. If the particular channel is occupied, the channel selection module 234 can refrain from selecting the particular channel for transmitting a communication and/or can select a different channel. In some examples, the channel selection module 234 can wait for time to lapse and can listen again (e.g., via communication with the listening module 230 and the sensor 226 and/or user device 202). In some examples, the channel selection module 234 can subsequently listen after subsequent lapses of time. That is, the channel selection module 234 can apply an exponential back-off algorithm for listening before transmitting. In some examples, if the channel selection module 234 determines that the particular channel is unoccupied (or occupied, but the associated signal level is below a threshold), the channel selection module 234 can select the particular channel for transmitting. In at least one example, the base station 204 can transmit via the particular channel at a reduced RF transmission power (e.g., a "hushed" RF transmission power).

In at least one example, the channel selection module 234 can determine that the signal level associated with the other device is below a threshold. That is, the channel selection module 234 can determine that the other device is transmitting via a particular channel at a RF transmission power that is below a threshold. In such examples, the channel selection module 234 can utilize channel sharing, as described above, to transmit one or more communications via the particular channel. In some examples, the channel selection module 234 can permit the base station 204 to transmit via the particular channel, but may request that the transmission is transmitted at a reduced RF transmission power (e.g., the base station 204 can implement a hushing mechanism).

In some examples, for instance in a time division duplex (TDD) mode, the channel selection module 234 can determine an amount of energy being used by the other device in association with a particular channel and can adjust uplink and downlink transmission ratios associated with the particular channel accordingly. For instance, if a channel occupied by the priority user has 9 MHz available for downlink transmission and 1 MHz available for uplink transmission, the channel selection module 234 can select the channel for transmitting one or more communications, but can modify the uplink and downlink transmission ratios to facilitate channel sharing.

While each channel sharing example is described individually, in some examples, one or more of the channel sharing techniques can be implemented.

In other examples, the channel selection module 234 can select a channel that is different than the channel being occupied by the other device. In such an example, the channel selection module 234 can select another channel that is a predetermined number of channels away from the channel being occupied by the other device. Or, the channel selection module 234 can select another channel that is more than a threshold number of channels away from the channel being occupied by the other device. In some examples, the predetermined number and/or threshold number can be determined by prescribed rules. In additional or alternative examples, the predetermined number and/or threshold number can be determined by historical data and/or machine learned models.

In some examples, the strength of the signal of the priority user can be used to determine the other channel. For instance, if the priority user is transmitting data via a particular channel at a RF transmission power greater than a threshold, the channel selection module 234 can select a channel within the CBRS band that is farther away from the particular channel than if the priority user is transmitting data via the particular channel at a RF transmission power below a threshold.

In some examples, one or more of the aforementioned channel selection techniques can be implemented. In at least one example, one or more of the aforementioned channel selection techniques can be prioritized over other aforementioned channel selection techniques based on a classification of the priority user. For instance, as a non-limiting example, if a priority user is determined to be associated with an Incumbent Access user, such as the United States Navy, the channel selection module 234 may refrain from channel sharing and may select another channel. However, if a priority user is determined to be associated with an Incumbent Access user that is not the United States Navy, the channel selection module 234 may attempt to utilize a same channel via channel sharing techniques described herein.

In at least one example, the channel selection module 234 can send an indication of the selected channel to the user device 202.

Furthermore, in at least one example, the base station 204 can transmit one or more communications via the selected channel (and/or at a determined RF transmission power), as described above. In some examples, the base station 204 can transmit the one or more communications based on subscriber information associated with one or more subscribers of the telecommunication service provider. That is, in some examples, the base station 204 can utilize subscriber identifiers and/or subscriber preferences for transmitting the one or more communications.

The data store 236 can store sensor data collected over time. While illustrated as being integrated into the base station 204 in FIG. 2, in some examples, the data store 236 can be stored remotely and can be accessible to the base station 204. In at least one example, the data store 236 can store sensor data and/or representations thereof received from the user device 202 (and/or additional and/or alternative user devices) and/or the sensor 226 can be stored in the data store 236. The data store 236 can thus represent the "historical data" described above. The historical data stored in the data store 236 can be used to determine frequencies for scanning, priorities for scanning, etc., as described above. In at least one example, the historical data can be used for training machine learned models as described above. In such an example, the historical data can be provided as input for training machine learned models, which can output frequencies for scanning, priorities for scanning, etc. Various machine learned models can be used. For instance, supervised machine learning algorithms, unsupervised machine learning algorithms, deep learning algorithms, etc. can be used for generating the machine learned models.

In at least one example, at least a portion of the data store 236 can be provided to the service provider computing device(s) 208, as described below.

As described above, the sensor 226 can include a spectrum analyzing device configured to analyze the CBRS band. In at least one example, the sensor 226 can scan the CBRS band to determine information representative of the radio environment particular to the CBRS band (e.g., sensor data). The sensor 226 can provide such sensor data to the listening module 230 for analyzing. In at least one example, the sensor 226 can scan the CBRS band responsive to receiving an instruction from the listening module 230 and can provide sensor data to the listening module 230 responsive to receiving the instruction.

In at least one example, the sensor 226 can additionally include one or more modules and data structures (e.g., computer-readable instructions, etc.) that, when executed by one or more processors, cause the one or more processors to send and/or receive instructions and/or information and, in some examples, make decisions and/or determinations with respect to timing and/or prioritization of channel scanning.

In some examples, the sensor 226 can scan each channel of the CBRS band individually. In at least one example, the sensor 226 can scan individual channels in parallel or serially. In other examples, the sensor 226 can scan two or more channels of the CBRS band together and then parse the sensor data to determine which data corresponds to individual channels.

In at least one example, the sensor 226 can utilize historical data to determine how to scan the channels of the CBRS band. For instance, in at least one example, the sensor 226 can determine, from historical data, that priority users typically use a particular channel. Accordingly, the sensor 226 can determine not to scan the particular channel, or to scan the particular channel after scanning one or more other channels. In some examples, the sensor 226 can utilize machine learned models to selectively determine which channels to scan and/or an order for scanning such channels. Or, the sensor 226 can determine, from sensor data, that a priority user is using a particular channel. Accordingly, the sensor 226 can determine not to scan the particular channel in a subsequent scan, or to scan the particular channel after scanning one or more other channels.

In some examples, the sensor 226 can receive an instruction from the listening module 230 which includes instructions on how to scan the CBRS band (e.g., timing and/or priority). In such an example, the listening module 230 can utilize historical data to selectively determine which channels to scan and/or the order for scanning such channels.

While a single sensor is shown and described, the base station 204 can include any number of sensors.

The communication hardware 228 provides wireless capabilities, such as connecting to user device(s), such as the user device 202, associated with a cellular network, a Wi-Fi network, or other wireless networks (e.g., network(s) 206). In at least one example, the communication hardware 228 can include radio hardware, which can include or be incorporated into processors, ASICs, programmable circuits such as FPGAs, or in other ways. In at least one example, the radio hardware can be capable of operating in the CBRS band. Additionally or alternatively, the communication hardware 228 can include network hardware, which can provide wired or wireless networking capabilities to the base station 104. Network hardware can include or be incorporated into processors, ASICs, programmable circuits such as FPGAs, or in other ways.

As described above, the base station 204 can communicate with the service provider computing device(s) 208. In at least one example, the service provider computing device(s) 208 can include processor(s) 238, computer-readable media 240, and communication hardware 242. For the purpose of this discussion, the processor(s) 238 and the computer-readable media 240 can have same or similar configurations and perform same or similar functions as the processor(s) 210 and the computer-readable media 211, respectively, as described above.

The computer-readable media 240 can include one or more modules and data structures including, for example, an information provisioning module 244, a training module 246, and a data store 248. The one or more modules and data structures can be in the form of stand-alone applications, productivity applications, an operating system component, or any other application or software module configured to perform operations as described herein.

The information provisioning module 244 can provide at least some of the sensor data to one or more entities requesting access to such data. For instance, other user device(s), base station(s), and/or service provider computing device(s) can send requests to the service provider computing device(s) 208 and the information provisioning module 244 can access the data store 248, described below, to provision at least some of the sensor data to the other user device(s), base station(s), and/or service provider computing device(s). In at least one example, the sensor data can be associated with a channel on which the base station 204 is operating. That is, in at least one example, the information provision module 244 can access sensor data from the data store 248, and information about which channel(s) are being used by the base station 204, and can provision such information as a service for other user device(s), base station(s), and/or service provider computing device(s) to use for making decisions regarding RF transmission power and/or channel selection.

The training module 246 can access historical data, which can be stored in the data store 248, described below. In at least one example, the historical data can be used for training machine learned models as described above. In such an example, the historical data can be provided as input for training machine learned models, which can output temporal frequencies for scanning, priorities for scanning, etc. In some examples, the historical data can be provided as input for training machine learned models, which can output distances (e.g., in numbers of channels) between a channel occupied by a priority user and another channel that can be used for a non-priority data transmission. Various machine learned models can be used. For instance, supervised machine learning algorithms, unsupervised machine learning algorithms, deep learning algorithms, etc. can be used for generating (e.g., training) the machine learned models.

The data store 248 can store sensor data collected over time. For example, the sensor data and/or representations thereof received from the user device 202 (and/or additional and/or alternative user devices) and/or the base station 204 can be stored in the data store 248. The data store 248 can thus represent the "historical data" described above. In some examples, channel(s) selected based on a particular portion of sensor data can be associated with such sensor data in the data store 248. In at least one example, the historical data can be used for training machine learned models as described above. In some examples, the data store 248 is stored locally on the service provider computing device(s) 208, as illustrated in FIG. 2. However, in additional or alternative examples, at least a portion of the data store 248 can be stored remotely and can be accessible to the service provider computing device(s) 208.

The communication hardware 242 provides wireless capabilities, such as connecting to user device(s), such as the user device 202, and/or base station(s), such as base station 204, associated with a cellular network, a Wi-Fi network, or other wireless networks (e.g., network(s) 206). In at least one example, the communication hardware 242 can include network hardware, which can provide wired or wireless networking capabilities to the service provider computing device(s) 208. Network hardware can include or be incorporated into processors, ASICs, programmable circuits such as FPGAs, or in other ways.

FIGS. 3-11 describe example processes for regulating access to the CBRS. The example processes are described in the context of the system of FIG. 2, but are not limited to that environment.

The processes described in association with FIG. 3-11 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations and/or processes can be combined in any order and/or in parallel to implement the processes.

Figure 3:
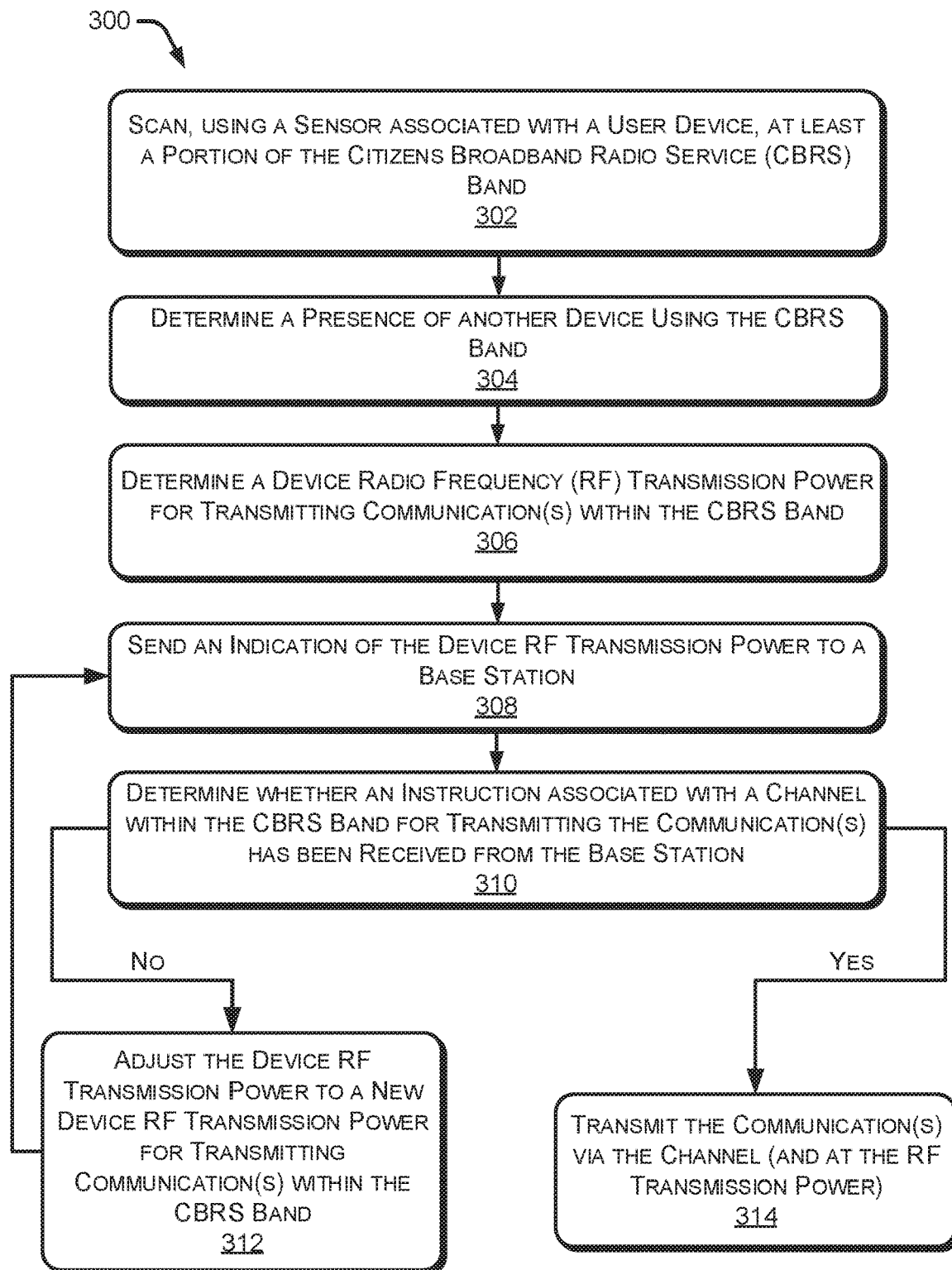
FIG. 3 illustrates an example process for regulating access to the CBRS band, as described herein.

FIG. 3 illustrates an example process 300 for regulating access to the CBRS, as described herein.

Block 302 illustrates scanning, using a sensor associated with a user device, at least a portion of the CBRS band. As described above, the listening module 216 can assess the environment of at least the CBRS band. In at least one example, the user device 202 can include a sensor 212, which can include a spectrum analyzing device configured to analyze the CBRS band. In at least one example, the sensor 212 can be configured to detect energy that is present in the CBRS band. For instance, the sensor 212 can scan the CBRS band to generate sensor data indicative of whether energy is present (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. In at least one example, the sensor 212 can be configured to generate sensor data indicative of which channel(s) are being used for transmitting data and/or a load associated with individual channel(s) (e.g., channel loading). Such sensor data can represent the radio environment particular to the CBRS band.

In at least one example, the listening module 216 can send an instruction to the sensor 212 instructing the sensor 212 to scan the CBRS band. In some examples, the instruction can be sent at a particular frequency. In other examples, the instruction can be sent in association with a data transmission (e.g., a communication), for instance before the data transmission is transmitted to the base station 204. In additional or alternative examples, the listening module 216 can receive an instruction from the base station 204 and can send the instruction to the sensor 212 responsive to receiving the instruction from the base station 204.

Block 304 illustrates determining a presence of another device using the CBRS band. Responsive to sending the instruction to the sensor 212, the listening module 216 can receive sensor data and can analyze the sensor data to determine the radio environment associated with the CBRS band. Sensor data can include, but is not limited to, an indication of whether energy is present (e.g., energy levels present (dbms)), an indication of who generated the energy (e.g., an owner of the energy, a source of the energy, another operator, etc.), an identity of an entity using the energy, noise associated with the CBRS band (e.g., a level of noise associated with the CBRS band), etc. In some examples, sensor data can identify which channels within the CBRS band are occupied, and to what extent such channels are occupied (e.g., channel loading). In at least one example, the listening module 216 can determine a presence of another device using the CBRS band based at least in part on the sensor data. In some examples, the listening module 216 can determine a signal level associated with the energy corresponding to the other device, an owner of the energy, an identity of an entity using the energy, a channel occupied by the energy, an extent to which the channel is occupied, etc.

Block 306 illustrates determining a device RF transmission power for transmitting communication(s) within the CBRS band. In at least one example, the RF transmission power selection module 218 can utilize sensor data received from the sensor 212 to determine a RF transmission power for transmitting a communication. In at least one example, if the sensor data indicates that another device is present (e.g., using a channel of the CBRS band) and that the device is a priority user, the RF transmission power selection module 218 can determine whether to transmit a communication. If the RF transmission power selection module 218 determines to transmit a communication, the RF transmission power selection module 218 can determine a RF transmission power for transmitting the communication. In some examples, the RF transmission power selection module 218 can adjust the RF transmission power up or down.

Block 308 illustrates sending an indication of the device RF transmission power to a base station. In at least one example, the RF transmission power selection module 218 can transmit an indication identifying the RF transmission power at which the user device 202 is transmitting to the base station 104.

Block 310 illustrates determining whether an instruction associated with a channel within the CBRS band for transmitting the communication(s) has been received from the base station. In some examples, the RF transmission power can be too low, such that the base station 204 cannot hear the user device 202. That is, in some examples, the RF transmission power may be below a threshold and the base station 204 may not be able to hear the user device 202. In at least one example, the RF transmission power selection module 218 can determine whether an instruction associated with a channel within the CBRS band for transmitting the communication(s) has been received from the base station 204.

Based at least in part on determining that an instruction associated with a channel within the CBRS band for transmitting the communication(s) has not been received from the base station, adjusting the device RF transmission power to a new device RF transmission power for transmitting communication(s) within the CBRS band, as illustrated in block 312. In such an example, process 300 can return to block 308, sending an indication of the (new) device RF transmission power to the base station 204. That is, in at least one example, the user device 202 can wait a period of time before re-transmitting the indication. If, after a predetermined number of attempts to transmit the indication and/or a lapse of a predetermined period of time, the RF transmission power selection module 218 does not receive a response from the base station 204, the RF transmission power selection module 218 can increase the RF transmission power and can transmit an indication of the new RF transmission power to the base station 204.

Based at least in part on determining that an instruction associated with a channel within the CBRS band for transmitting the communication(s) has been received from the base station, the user device 202 can transmit the communication(s) via the channel (and at the RF transmission power), as illustrated in block 314. In at least one example, responsive to transmitting the indication of the RF transmission power to the base station 204, the user device 202 can receive a response, which can include a channel assignment for transmitting a communication. As such, the user device 202 can transmit a communication, at the RF transmission power and via the channel prescribed by the base station 204.

Figure 4:
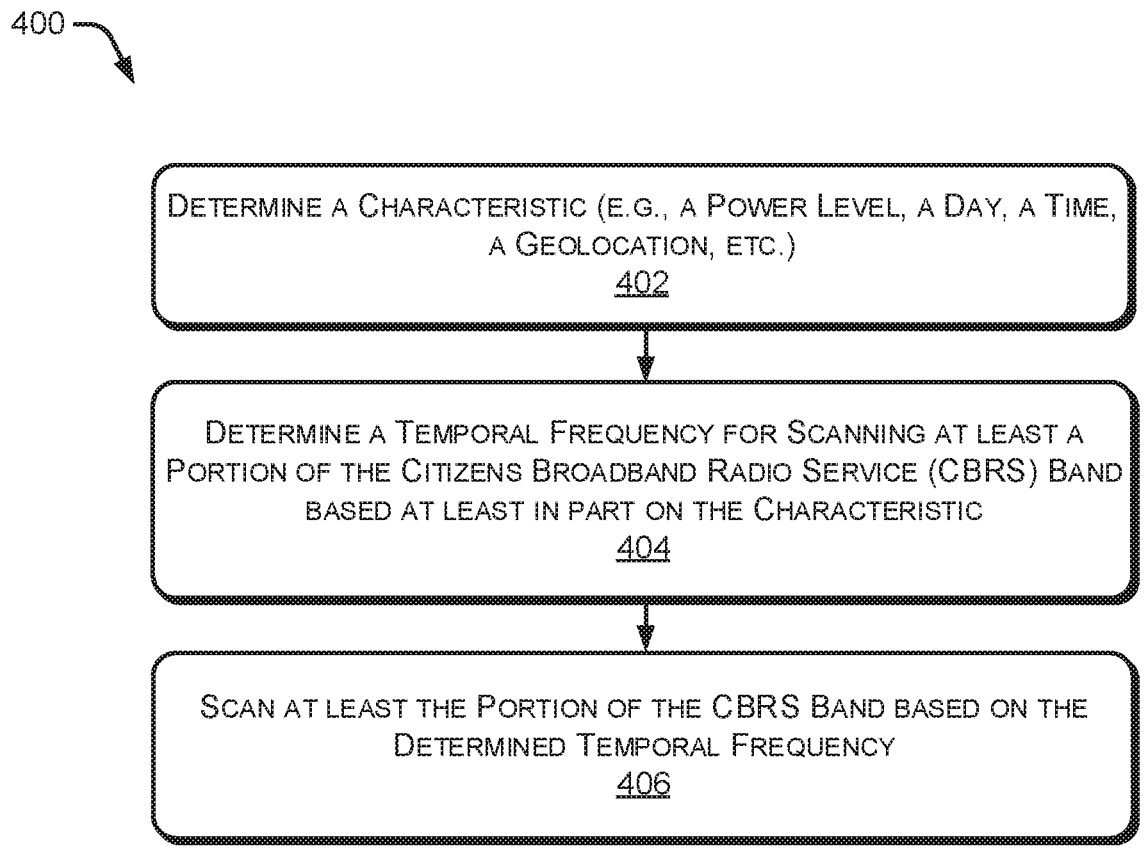
FIG. 4 illustrates an example process for determining when to scan the CBRS band based on a characteristic associated with a sensor, as described herein.

FIG. 4 illustrates an example process 400 for determining when to scan the CBRS band based on a characteristic associated with a sensor, as described herein. Process 400 is described below in the context of the user device 202. That is, process 400 is directed to the listening module 216 determining the temporal frequency for sending an instruction to the sensor 212 to scan the CBRS band based on one or more characteristics. However, in an additional or alternative example, the listening module 230 can perform the same or similar operations to determine a temporal frequency for the sensor 226 to scan the CBRS band. In such an example, the listening module 230 may not consider a power level of the base station 204, as base stations typically are not power constrained (unlike user devices).

Block 402 illustrates determining a characteristic. In at least one example, the listening module 216 can determine a time, a date, and/or a geolocation associated with the user device 202. Additionally or alternatively, the listening module 216 can determine a power level associated with the user device 202.

Block 404 illustrates determining a timing and/or a temporal frequency for scanning at least a portion of the CBRS band based at least in part on the characteristic. In at least one example, the listening module 216 can determine the temporal frequency for sending the instruction based on the characteristic. For instance, in at least one example, the listening module 216 can determine a temporal frequency for sending the instruction based on the time, the date, the geolocation, and/or the power level associated with the user device 202. In some examples, the listening module 216 can utilize machine learned models to determine the temporal frequency for sending the instruction.

Block 406 illustrates scanning at least a portion of the CBRS band based on the determined temporal frequency. Based at least in part on determining the temporal frequency for scanning at least a portion of the CBRS band, the listening module 216 can send instructions to the sensor 212 to scan the CBRS band based on the determining temporal frequency. Managing the temporal frequency at which the user device 202 scans the CBRS band can reduce power consumption and compute. That is, intelligently adjusting the temporal frequency at which the sensor 212 scans the CBRS band can reduce power consumption (by reducing the energy required to assess the CBRS band) and reduce compute (by reducing the resources required to assess the CBRS band).

While FIG. 4 is directed to determining the temporal frequency for sending an instruction to scan the CBRS band, in an additional or alternative example, process 400 can similarly be used for determining any timing associated with sending such an instruction. In some examples, process 400 can additionally or alternatively be performed by the sensor 212 and/or the sensor 226.

FIG. 5 illustrates an example process 500 for determining portion(s) of the CBRS band to scan based on historical data, as described herein. As described above, in some examples, the sensor 212 can scan each channel of the CBRS band individually. In at least one example, the sensor 212 can scan individual channels in parallel or serially. In other examples, the sensor 212 can scan two or more channels of the CBRS band together and then parse the sensor data to determine which data corresponds to individual channels. Process 500 is described in the context of the sensor 212 on the user device 202. However, in an additional or alternative example, the sensor 226 on the base station 204 can perform the same or similar operations. Furthermore, as described above, in additional or alternative examples, the listening module 216 and/or the listening module 230 can perform the same or similar operations and can send an instruction to the sensor 212 and/or the sensor 226, respectively, regarding priorities for scanning channels within the CBRS band.

Block 502 illustrates accessing historical data associated with use of the CBRS band. In at least one example, the sensor 226 can access historical data. Such historical data can be stored on the user device 202 and/or provisioned from a base station 204 (e.g., from the data store 236) and/or the service provider computing device(s) 208 (e.g., from the data store 248). The historical data, as described above, can include sensor data determined from the sensor 212 and/or the sensor 226 (and/or additional or alternative sensors) over time.

Block 504 illustrates determining, based at least in part on the historical data, channel(s) of a plurality of channels that are typically occupied by priority user(s). In at least one example, the sensor 212 can utilize historical data to determine how to scan the channels of the CBRS band. In some examples, the sensor 212 can utilize machine learned models to selectively determine which channels to scan and/or an order for scanning such channels, as described above. In at least one example, the historical data can indicate one or more channels that are typically occupied by priority users. That is, the sensor 212 can determine, based on the historical data, a likelihood that one or more channels are occupied by priority users and can determined that the likelihood is greater than a threshold, indicating that the one or more channels are likely to be occupied by priority users.

Block 506 illustrates scanning at least a portion of the CBRS band that excludes the channel(s) that are typically occupied by priority user(s) prior to scanning other portion(s) of the CBRS band associated with the channel(s) that are typically occupied by priority users. In at least one example, based on determining the channel(s) that are typically occupied by priority user(s), the sensor 212 can determine to scan other channel(s) prior to scanning the channel(s) that are typically occupied by priority user(s).

Figure 6:
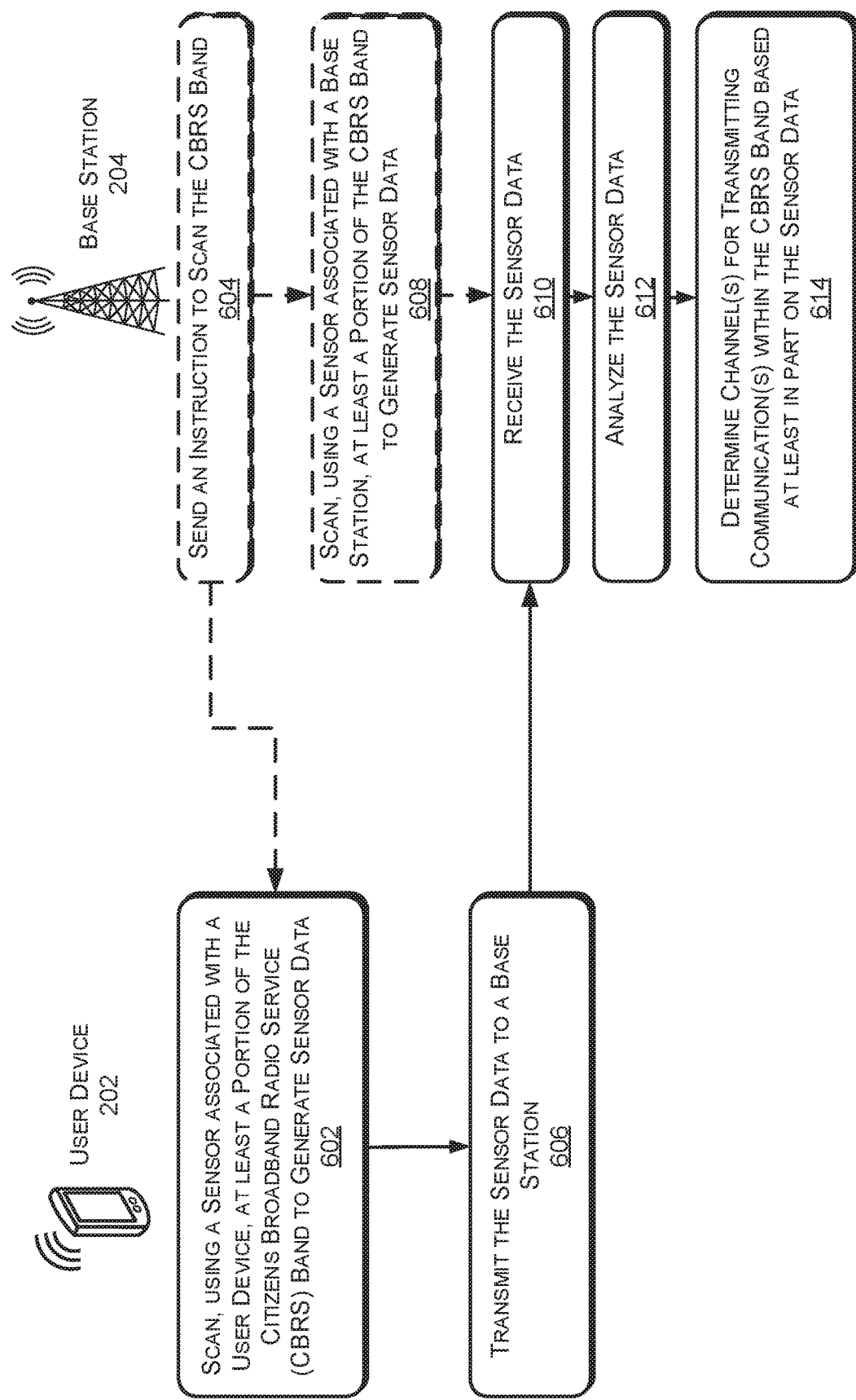
FIG. 6 illustrates an example process for regulating access to the CBRS band, as described herein.

FIG. 6 illustrates an example process 600 for regulating access to the CBRS band, as described herein.

Block 602 illustrates scanning, using a sensor associated with a user device, at least a portion of the CBRS band to generate sensor data. As described above, the listening module 216 can assess the environment of at least the CBRS band. In at least one example, the user device 202 can include a sensor 212, which can include a spectrum analyzing device configured to analyze the CBRS band. In at least one example, the sensor 212 can be configured to detect energy that is present in the CBRS band. For instance, the sensor 212 can scan the CBRS band to generate sensor data indicating whether energy is present (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. In at least one example, the sensor 212 can be configured to generate sensor data indicative of which channel(s) are being used for transmitting data and/or a load associated with individual channel(s) (e.g., channel loading). Such sensor data can represent the radio environment particular to the CBRS band. The sensor 212 can provide such sensor data to the listening module 216 for analyzing.

In at least one example, the listening module 216 can send an instruction to the sensor 212 instructing the sensor 212 to scan the CBRS band. In some examples, the instruction can be sent at a particular frequency. In other examples, the instruction can be sent in association with a data transmission (e.g., a communication), for instance before the data transmission is transmitted to the base station 204. In additional or alternative examples, the listening module 216 can receive an instruction from the base station 204, as illustrated in block 604.

Block 606 illustrates transmitting the sensor data to a base station. In at least one example, the listening module 216 can transmit sensor data and/or representations thereof to the base station 204. In some examples, the listening module 216 can transmit the sensor data and/or representations thereof responsive to receiving the instruction from the base station 204.

Block 608 illustrates scanning, using a sensor associated with the base station, at least a portion of the CBRS band to generate sensor data. As described above, the listening module 230 can assess the environment of at least the CBRS band. In at least one example, the base station 204 can include a sensor 226, which can include a spectrum analyzing device configured to analyze the CBRS band. In at least one example, the sensor 226 can be configured to detect energy that is present in the CBRS band. For instance, the sensor 226 can scan the CBRS band to determine sensor data indicative of whether energy is present (e.g., energy levels present (dbms), who generated the energy (e.g., an owner of the energy, a source of the energy, another operator, etc.), an identity of an entity using the energy, noise associated with the CBRS band (e.g., a level of noise associated with the CBRS band), etc. In at least one example, the sensor 226 can be configured to generate sensor data indicative of which channel(s) are being used for transmitting data and/or a load associated with individual channel(s). Such sensor data can represent the radio environment particular to the CBRS band. The sensor 226 can provide such sensor data to the listening module 230 for analyzing. That is, the sensor 226 can have a same or similar structure and perform the same or similar functions as the sensor 212, described above with reference to the user device 202.

In at least one example, the listening module 230 can send an instruction to the sensor 226 instructing the sensor 226 to scan the CBRS band, as illustrated in block 604. In some examples, the instruction can be sent at a particular frequency. In other examples, the instruction can be sent in association with a delivery of a data transmission (e.g., a communication).

Block 610 illustrates receiving the sensor data. In at least one example, the listening module 230 associated with the base station 204 can receive the sensor data and/or representations thereof received from the user device 202 and/or the sensor data from the sensor 226. In some examples, the listening module 230 can aggregate the sensor data to generate aggregated data. In some examples, sensor data and/or representations thereof can be received from other user devices and such sensor data can be added to the aggregated sensor data.

Block 612 illustrates analyzing the sensor data. In at least one example, the listening module 230, the RF transmission power selection module 232, and/or the channel selection module 234 can analyze the aggregated sensor data to determine how to transmit communications to determine channel(s) for transmitting communication(s) within the CBRS band based at least in part on the sensor data, as illustrated in block 614. Additional details regarding determining channel(s) for transmitting communication(s) within the CBRS band based at least in part on the sensor data are provided below with respect to FIGS. 8-11. In at least one example, the base station 204 can transmit communication(s) via the channel(s) determined, based at least in part on subscriber information (e.g., subscriber identifier, subscriber preferences, etc.) associated with subscriber(s) of a telecommunications service.

Figure 7:
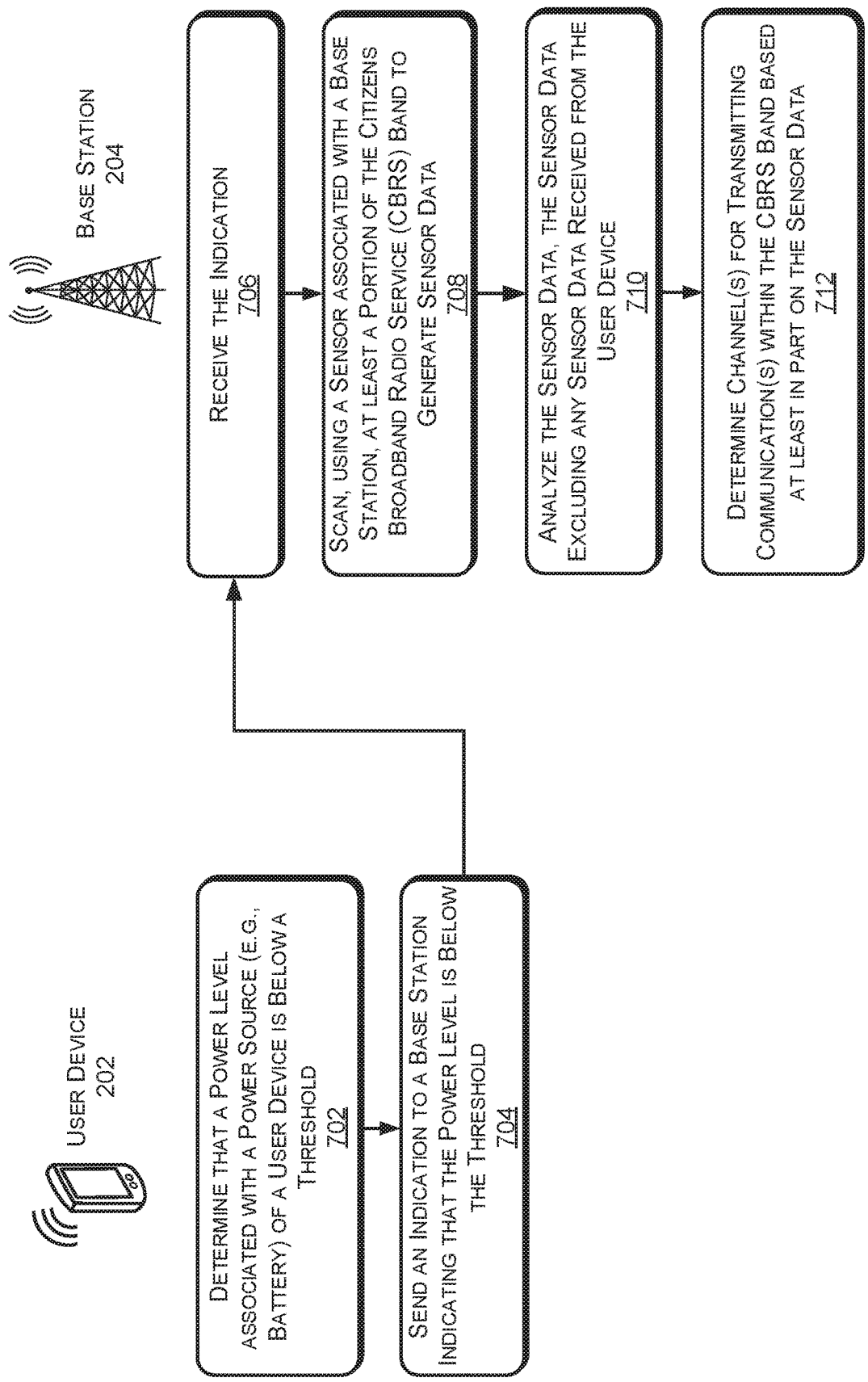
FIG. 7 illustrates an example process for regulating access to the CBRS band, as described herein.

FIG. 6 is directed to device-assisted CBRS access regulation. That is, in some examples, the base station 204 can utilize sensor data from one or more user devices, such as user device 202, to determine how to transmit communication(s) via the CBRS band. However, in alternative examples, the base station 204 can make such determinations without assistance from user devices. FIG. 7 is directed to such an example.

FIG. 7 illustrates an example process 700 for regulating access to the CBRS band, as described herein.

Block 702 illustrates determining that a power level associated with a power source of a user device is below a threshold. As described above, the sensor 212 can generate sensor data indicative of a power level associated with the user device 202. For instance, the sensor 212 can determine a remaining power level associated with a power source of the user device 202, such as a battery. In at least one example, the listening module 216 can compare the power level with a threshold and determine that the power level is below the threshold. The threshold can be configurable.

Block 704 illustrates sending an indication to a base station indicating that the power level is below the threshold. In some examples, responsive to determining that the power level is below a threshold, the listening module 216 can send a notification to the base station 204 indicating that the power level is below a threshold. In such examples, the base station 204 can receive the notification and determine that it is responsible for assessing the radio environment of the CBRS band and determining how to transmit communications in such a radio environment.

Block 706 illustrates receiving the indication. In some examples, responsive to determining that the power level is below a threshold, the listening module 216 can send a notification to the base station 204 indicating that the power level is below a threshold. In such examples, the base station 204 can receive the notification and determine that it is responsible for assessing the radio environment of the CBRS band and determining how to transmit communications in such a radio environment. As a result, the listening module 230 can send an instruction to the sensor 226 to scan at least a portion of the CBRS band to generate sensor data, as illustrated in block 708.

Block 710 illustrates analyzing the sensor data, the sensor data excluding any sensor data received from the user device. In at least one example, the listening module 230, the RF transmission power selection module 232, and/or the channel selection module 234 can analyze the sensor data to determine how to transmit communications to determine channel(s) for transmitting communication(s) within the CBRS band based at least in part on the sensor data, as illustrated in block 712. In the example described in FIG. 7, where the base station 204 cannot rely on additional sensor data from the user device 202, the sensor data can exclude sensor data from the user device 202. Additional details regarding determining channel(s) for transmitting communication(s) within the CBRS band based at least in part on the sensor data are provided below with respect to FIGS. 8-11.

Figure 8:
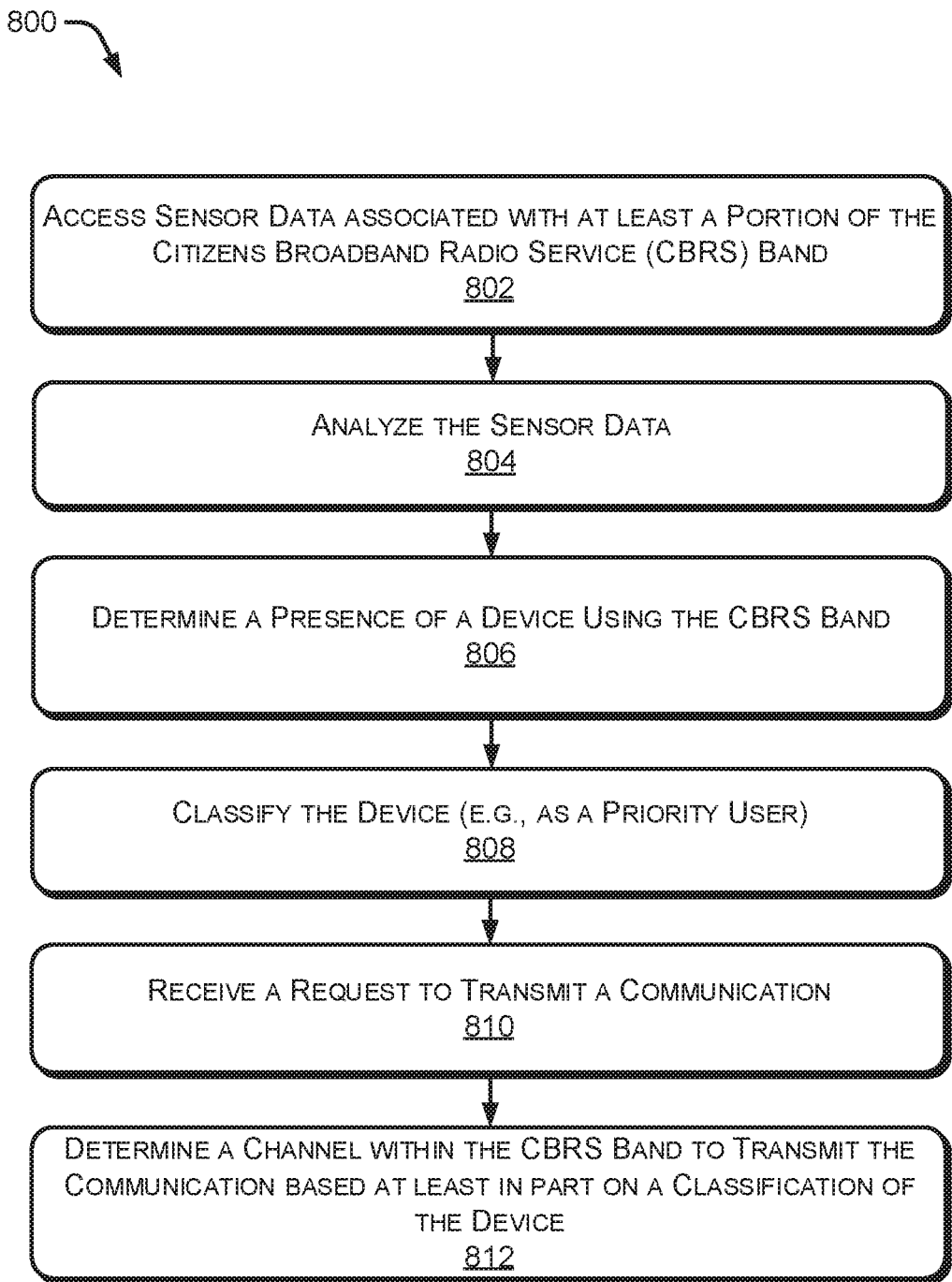
FIG. 8 illustrates an example process for determining a channel within the CBRS band to transmit a communication, as described herein.

FIG. 8 illustrates an example process 800 for determining a channel within the CBRS band to transmit a communication, as described herein.

Block 802 illustrates accessing sensor data associated with at least a portion of the CBRS band. As described above, in at least one example, the listening module 230 associated with the base station 204 can receive sensor data and/or representations thereof received from the user device 202 and/or sensor data from the sensor 226. In some examples, the listening module 230 can aggregate the sensor data to generate aggregated data. In some examples, sensor data and/or representations thereof can be received from other user devices and such sensor data can be added to the aggregated sensor data.

Block 804 illustrates analyzing the sensor data. In at least one example, the listening module 230, the RF transmission power selection module 232, and/or the channel selection module 234 can analyze the aggregated sensor data to determine how to transmit communications to determine channel(s) for transmitting communication(s) within the CBRS band based at least in part on the sensor data. For instance, in at least one example, in at least one example, the channel selection module 234 can analyze the sensor data to determine whether the CBRS band is occupied by another device, as described below.

Block 806 illustrates determining a presence of a device using the CBRS band. In at least one example, the channel selection module 234 can analyze the sensor data and can determine that at least a portion of the CBRS band is occupied by another device. In such an example, the channel selection module 234 can analyze the sensor data to determine how much energy is present in the CBRS band (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. Furthermore, in at least one example, the channel selection module 234 can determine which channel(s) are occupied and an extent to which such channel(s) are occupied (e.g., channel loading). That is, in at least one example, the channel selection module 234 can identify another device that is using the CBRS band and can identify which channel the other device is using. Further, the channel selection module 234 can identify an energy level (dbms) the other device is using and an extent to which the other device is using the channel.

Block 808 illustrates classifying the device (e.g., as a priority user). The channel selection module 234 can classify the other device. For instance, the channel selection module 234 can analyze the sensor data to determine whether the other device is associated with a priority user (e.g., Incumbent Access user or Priority Access user). In some examples, the channel selection module 234 can further classify the other device, for instance, as being associated with the United States Navy or Federal Satellite Service, etc.

In some examples, the channel selection module 234 can try various codes to identify the other device and, if none of them work (e.g., identify a known user), the channel selection module 234 can classify the other device (e.g., as a priority user). Additionally or alternatively, the channel selection module 234 can determine that a communication protocol associated with the energy in the CBRS band is non-UE based traffic, and the channel selection module 234 can classify the other device (e.g., as a priority user) based at least in part on determining that the communication protocol is non-UE based traffic. Further, in at least one example, the channel selection module 234 can determine a power level associated energy that is present in the CBRS band, and can determine that the power level meets or exceeds some threshold such that only a priority user (e.g., a U.S. Navy ship) could be transmitting at such a power level. Accordingly, the channel selection module 234 can classify the other device as a priority user. Other techniques can be used to classify the other device, for instance, the channel selection module 234 can utilize a direction of the energy in the CBRS band to classify the other device (e.g., water based transmissions are likely from a boat, and therefore, likely to be from a priority user), etc.

Block 810 illustrates receiving a request to transmit a communication. In at least one example, the base station 204 can receive a request to transmit a communication. In some examples, the request can be from the user device 202. In other examples, the request can be from a different user device than the user device 202.

Block 812 illustrates determining a channel within the CBRS band to transmit the communication based at least in part on a classification of the device. In at least one example, based on receiving the request to transmit a communication, the channel selection module 234 can determine a channel within the CBRS band to transmit the communication, as described below with reference to FIGS. 9-11. In at least one example, the RF transmission power selection module 232 can additionally determine a RF transmission power for transmitting the communication (or the user device 202 can provide such).

While block 810 is illustrated after accessing the sensor data in block 802, in some examples, the base station 204 can access the sensor data at a same time as the request to transmit the communication is received and/or after the request to transmit the communication is received.

Figure 9:
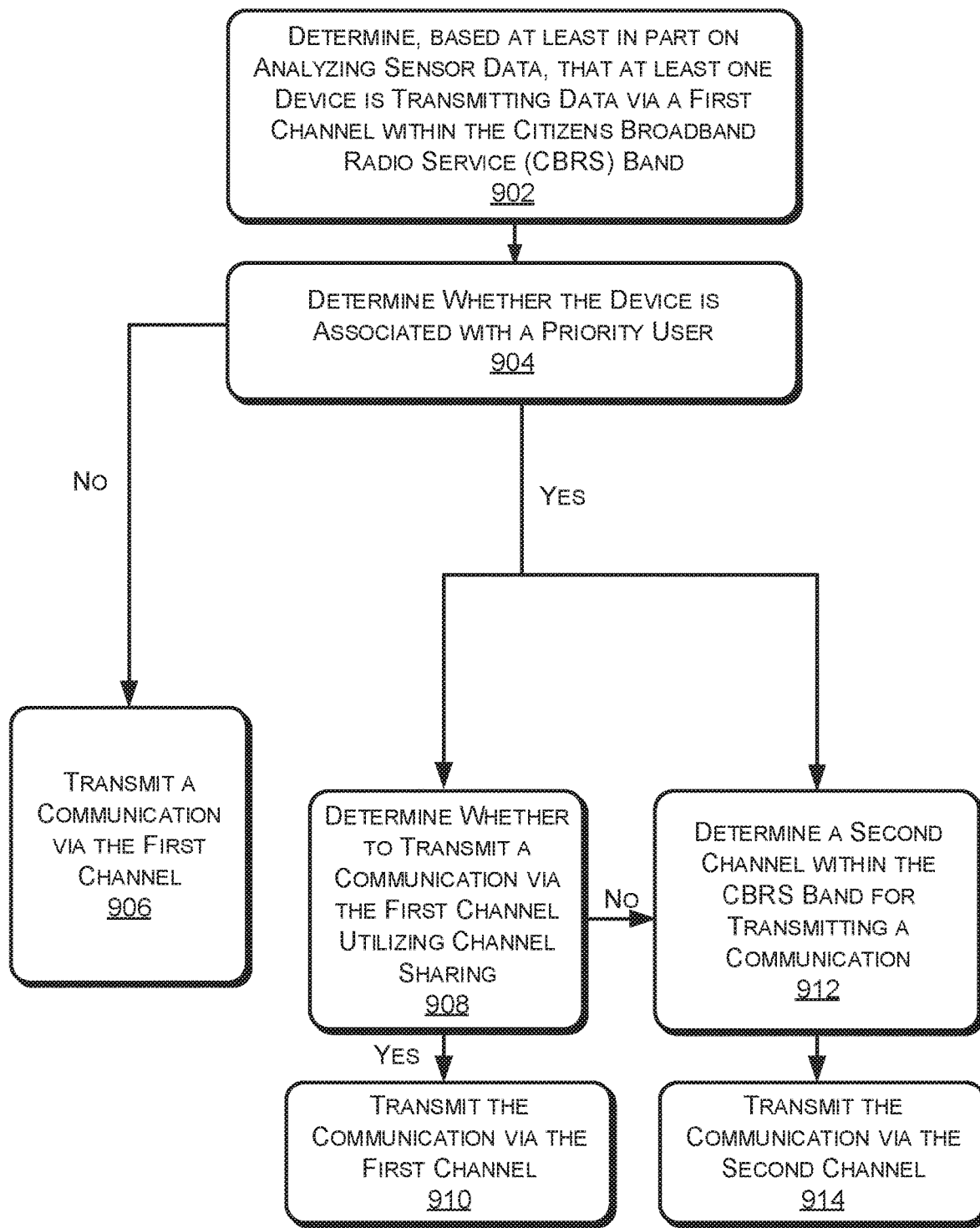
FIG. 9 illustrates an example process for determining a channel within the CBRS band to transmit a communication, as described herein.

FIG. 9 illustrates an example process 900 for determining a channel within the CBRS band to transmit a communication, as described herein.

Block 902 illustrates determining, based at least in part on analyzing sensor data, that at least one device is transmitting data via a first channel within the CBRS band. In at least one example, the channel selection module 234 can analyze the sensor data and can determine that at least a portion of the CBRS band is occupied by another device. In such an example, the channel selection module 234 can analyze the sensor data to determine how much energy is present in the CBRS band (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. Furthermore, in at least one example, the channel selection module 234 can determine which channel(s) are occupied and extent to which such channel(s) are occupied (e.g., channel loading). That is, in at least one example, the channel selection module 234 can determine that another device is transmitting data via a first channel.

Block 904 illustrates determining whether the device is associated with a priority user. The channel selection module 234 can classify the other device. For instance, the channel selection module 234 can analyze the sensor data to determine whether the other device is associated with a priority user (e.g., Incumbent Access user or Priority Access user). That is, the channel selection module 234 can analyze the sensor data to determine whether the owner and/or the entity using the energy is a priority user.

Based at least in part on determining that the device is not associated with a priority user (e.g., "no" in block 904), the base station 204 can transmit a communication via the first channel, as illustrated in block 906. In at least one example, if the detected device (e.g., the other device) is not a priority user, the channel selection module 234 can select a channel in the CBRS band for transmitting one or more communications, which may be the first channel. In an example where the sensor data is associated with a particular channel or set of channels, the channel selection module 234 can select the particular channel or any channel within the set of channels. The channel selection module 234 cannot select a channel unless it has first "listened" to such a channel. That is, the channel selection module 234 cannot select a channel for which it does not have sensor data.

In at least one example, based at least in part on determining that the device is associated with a priority user (e.g., "yes" in block 904), the base station 204 can determine whether to transmit a communication via the first channel utilizing channel sharing, as illustrated in block 908. In some examples, the channel selection module 234 can transmit a communication via a same channel that is occupied by the priority user utilizing channel sharing. For instance, in at least one example, responsive to determining that the other device is a priority user that is using the first channel, the channel selection module 234 can also use the first channel so long as channel sharing techniques are implemented. Additional details associated with channel sharing are described below with reference to FIGS. 10 and 11. Based at least in part on determining to transmit the communication via the first channel, the base station 204 can transmit the communication via the first channel, as illustrated in block 910. In some examples, the base station 204 can transmit via the first channel at a RF transmission power as determined by the RF transmission power selection module 232 and/or the user device 202.

In an additional or alternative example, based at least in part on determining that the device is associated with a priority user, the base station 204 can determine a second channel within the CBRS band for transmitting a communication, as illustrated in block 912. In at least one example, the channel selection module 234 can attempt to transmit a communication via the first channel utilizing channel sharing (e.g., block 908) prior to selecting another channel (e.g., block 912). In other examples, the channel selection module 234 can proceed directly to block 912, for instance, based on a classification of the priority user.

In at least one example, the channel selection module 234 can select a channel that is different than the channel being occupied by the other device. In such an example, the channel selection module 234 can select another channel that is a predetermined number of channels away from the channel being occupied by the other device. Or, the channel selection module 234 can select another channel that is more than a threshold number of channels away from the channel being occupied by the other device. In some examples, the predetermined number and/or threshold number can be determined by prescribed rules. In additional or alternative examples, the predetermined number and/or threshold number can be determined by historical data and/or machine learned models. Accordingly, in at least one example, the channel selection module 234 can select a second channel that is different than the first channel. The second channel can be a predetermined number of channels away from the first channel, a threshold number of channels away from the first channel, etc.

In some examples, the strength of the signal of the priority user can be used to determine the other channel. For instance, if the priority user is transmitting data via a particular channel at a RF transmission power greater than a threshold, the channel selection module 234 can select a channel within the CBRS band that is farther away from the particular channel than if the priority user is transmitting data via the particular channel at a RF transmission power below a threshold.

Block 914 illustrates transmitting the communication via the second channel. Based at least in part on selecting the second channel, the base station 204 can transmit the communication via the second channel. In some examples, the base station 204 can transmit via the second channel at a RF transmission power as determined by the RF transmission power selection module 232 and/or the user device 202.

Figure 10:
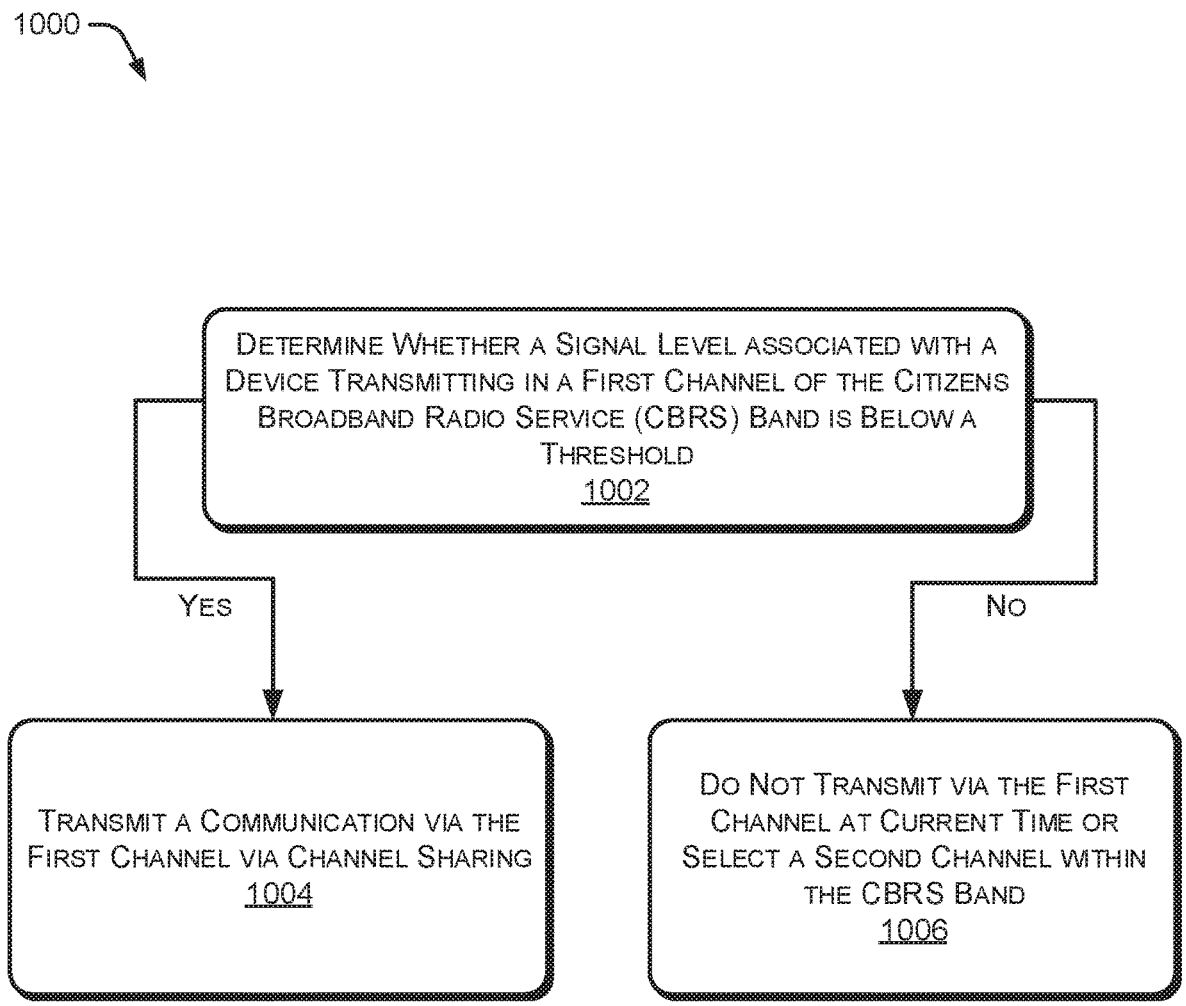
FIG. 10 illustrates an example process for determining a channel within the CBRS band to transmit a communication, as described herein.

FIG. 10 illustrates an example process 1000 for determining a channel within the CBRS band to transmit a communication as described herein. As described above, the detected device (e.g., the other device) may be a priority user. In some examples, the channel selection module 234 can transmit a communication via a same channel that is occupied by the priority user utilizing channel sharing. In at least one example, the channel selection module 234 can utilize channel sharing based on determining that the detected device is transmitting at a signal level below a threshold.

Block 1002 illustrates determining whether a signal level associated with a device transmitting in a first channel of the CBRS band is below a threshold. In at least one example, the channel selection module 234 can analyze sensor data to determine that a signal level associated with a device transmitting in a first channel is below a threshold. That is, the channel selection module 234 can determine that the device is transmitting via the first channel at a RF transmission power that is below a threshold.

Based at least in part on determining that the signal level associated with the device transmitting in the first channel of the CBRS band is below the threshold, the base station 204 can transmit a communication via the first channel via channel sharing, as illustrated in block 1004. In such examples, the channel selection module 234 can utilize channel sharing, as described above, to transmit one or more communications via the first channel. In some examples, the channel selection module 234 can permit the base station 204 to transmit via the first channel, but may request that the transmission is transmitted at a reduced RF transmission power (e.g., the base station 204 can implement a hushing mechanism).

Based at least in part on determining that the signal level associated with the device transmitting in the first channel of the CBRS band meets or exceeds the threshold, the channel selection module 234 can refrain from selecting the first channel for transmitting the communication at the current time or can select a second channel within the CBRS band for transmitting the communication, as illustrated in block 1006. If the channel selection module 234 refrains from selecting the first channel at the current time, the channel selection module 234 can re-listen to the CBRS environment at a later time (e.g., after a lapse of a period of time) to determine whether to transmit via the first channel at the later time. As described above, in some examples, the channel selection module 234 can implement an exponential back off for listening to determine whether the first channel is viable for transmitting communication(s), or if a second channel is to be selected.

Figure 11:
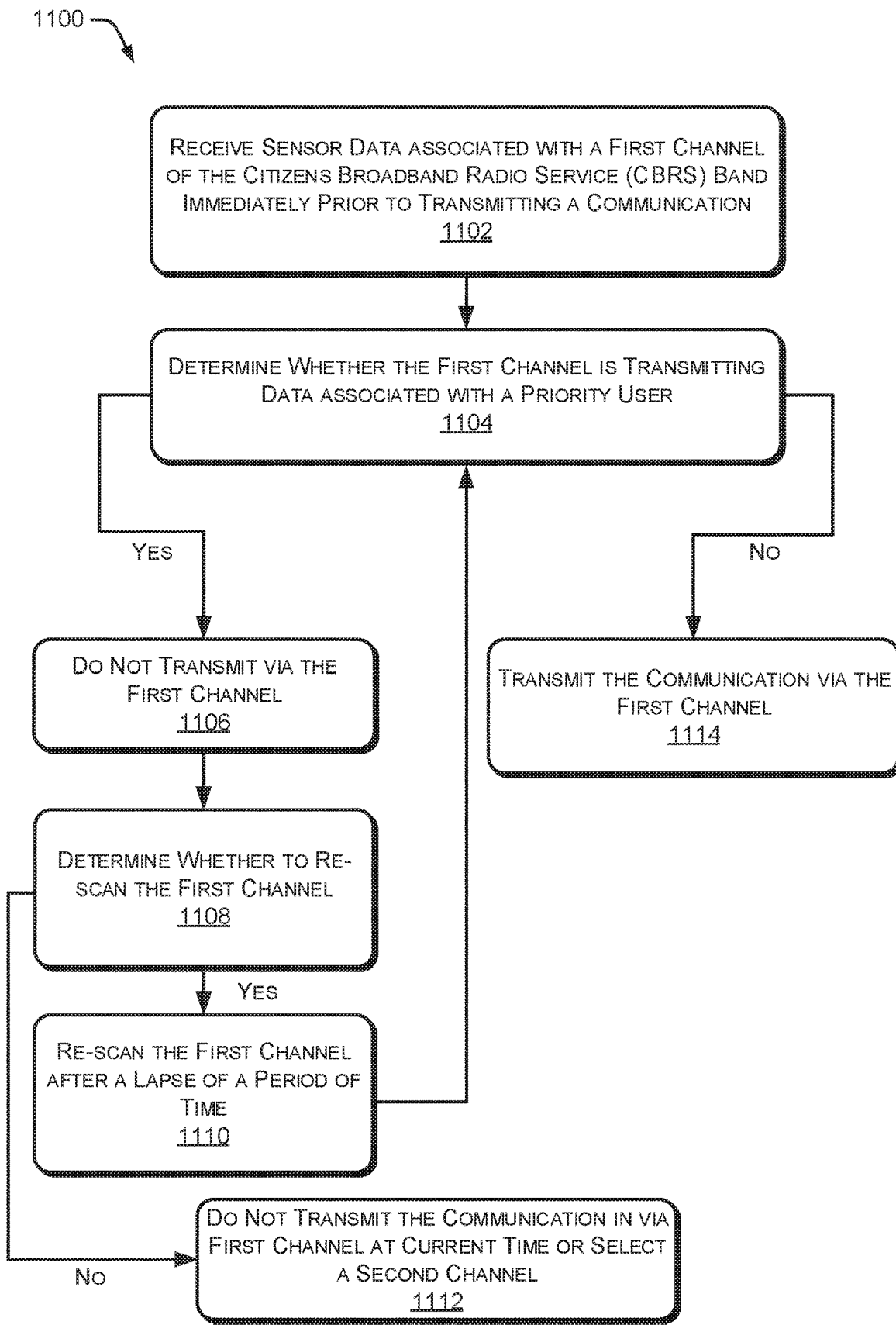
FIG. 11 illustrates an example process for determining a channel within the CBRS band to transmit a communication, as described herein.

FIG. 11 illustrates an example process 1100 for determining a channel within the CBRS band to transmit a communication as described herein. As described above, in some examples, the channel selection module 234 can transmit a communication via a same channel that is occupied by the priority user utilizing channel sharing. For instance, in at least one example, responsive to determining that the other device is a priority user that is using a particular channel, the channel selection module 234 can also use the particular channel after listening immediately prior to transmitting.

Block 1102 illustrates receiving sensor data associated with a first channel of the CBRS band immediately prior to transmitting a communication. In at least one example, responsive to receiving a communication, the channel selection module 234 can send a request for sensor data representative of the environment of the CBRS band immediately prior to transmitting a communication. That is, the channel selection module 234 can send a request to the listening module 230 to listen to the CBRS environment. The listening module 230 can send an instruction to the sensor 226 and/or the user device 202 to scan the CBRS environment. Responsive to such instruction, the listening module 230 can receive sensor data and can provision such sensor data to the channel selection module 234. The sensor data can be associated with one or more channels of the CBRS band.

Block 1104 illustrates determining whether the first channel is transmitting data associated with a priority user. In at least one example, the channel selection module 234 can analyze the sensor data and can determine that at least a portion of the CBRS band is occupied by another device. In such an example, the channel selection module 234 can analyze the sensor data to determine how much energy is present in the CBRS band (e.g., energy levels present (dbms)), who generated the energy (e.g., an owner of the energy, a source of the energy, another operator, etc.), an identity of an entity using the energy, noise associated with the CBRS band (e.g., a level of noise associated with the CBRS band), etc. Furthermore, in at least one example, the channel selection module 234 can determine which channel(s) are occupied and extent to which such channel(s) are occupied (e.g., channel loading). The channel selection module 234 can classify the identified device, for instance as a priority user.

Based at least in part on determining that the first channel is transmitting data associated with a priority user, the base station 204 can refrain from selecting the first channel for transmitting a communication, as illustrated in block 1106. That is, if the first channel is occupied by a priority user, the channel selection module 234 can refrain from selecting the first channel for transmitting the communication. In an alternate example, the channel selection module 234 can select a different channel.

Block 1108 illustrates determining whether to re-scan the first channel. In some examples, the channel selection module 234 can wait for time to lapse and can listen again (e.g., via communication with the listening module 230 and the sensor 226 and/or user device 202). That is, in at least one example, after determining that a lapse of a period of time occurred, the channel selection module 234 can send an instruction to the listening module 230, which can send a new instruction to the sensor 226 and/or the user device 202 to scan the CBRS environment.

Based at least in part on re-scanning the first channel after a lapse of a period of time, as illustrated in block 1100, the channel selection module 234 can receive updated sensor data associated with the first channel and process 1100 can return to block 1104. In some examples, the channel selection module 234 can subsequently listen after one or more subsequent lapses of time. That is, the channel selection module 234 can apply an exponential back-off algorithm for listening before transmitting.

In some examples, the channel selection module 234 can determine not to re-scan the first channel. For instance, the exponential back-off algorithm may have been exhausted (e.g., reaches a ceiling). In such examples, the base station 104 can refrain from transmitting the communication via the first channel at the current time or can select a second channel, as illustrated in block 1112. That is, the channel selection module 234 can refrain from selecting the first channel for transmitting the communication or can select a second channel.

Based at least in part on determining that the first channel is not transmitting data associated with a priority user, the channel selection module 234 can select the first channel for transmitting the communication and the base station 204 can transmit the communication via the first channel, as illustrated in block 1114. In some examples, the base station 204 can transmit via the particular channel at a reduced RF transmission power.

In some examples, as described above, the channel selection module 234 can adjust uplink and downlink transmission rations to facilitate channel sharing. For instance, in a time division duplex (TDD) mode, the channel selection module 234 can determine an amount of energy being used by the other device in association with a particular channel and can adjust uplink and downlink transmission ratios associated with the particular channel accordingly. For instance, if a channel occupied by the priority user has 9 MHz available for downlink transmission and 1 MHz available for uplink transmission, the channel selection module 234 can select the channel for transmitting one or more communications, but can modify the uplink and downlink transmission ratios to facilitate channel sharing.

While each channel sharing example is described individually, in some examples, one or more of the channel sharing techniques can be implemented.

Furthermore, in some examples, one or more of the aforementioned channel selection techniques can be implemented. In at least one example, one or more of the aforementioned channel selection techniques can be prioritized over other aforementioned channel selection techniques based on a classification of the priority user. For instance, as a non-limiting example, if a priority user is determined to be associated with an Incumbent Access user, such as the United States Navy, the channel selection module 234 may refrain from channel sharing and may select another channel. However, if a priority user is determined to be associated with an Incumbent Access user that is not the United States Navy, the channel selection module 234 may attempt to utilize a same channel via channel sharing techniques described herein, as an alternative to, or prior to, selecting another channel.

While the disclosure provided above is directed to regulating access to the CBRS, in additional or alternative examples, same or similar techniques can be implemented for regulating access to other frequency bands. For instance, techniques described herein can be implemented for regulating access to other frequency bands where a prioritization framework is to be implemented to ensure use by priority users is not negatively impacted.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A device comprising:
a sensor configured to operate in a frequency band associated with Citizens Broadband Radio Service;
one or more processors; and
one or more computer-readable media storing instructions executable by the one or more processors, wherein the instructions, when executed by one or more processors, cause the one or more processors to:
scan, using the sensor, at least a portion of the frequency band to generate sensor data indicating at least energy present in the portion of the frequency band; and
transmit the sensor data to a base station, the base station configured to analyze the sensor data and determine how to transmit communications within the frequency band based at least in part on the sensor data and subscriber information associated with subscribers of a telecommunication service.

2. The device as claim 1 recites, wherein the instructions, when executed by one or more processors, cause the one or more processors further to determine, based on the sensor data, a source of the energy present in the frequency band.

3. The device as claim 1 recites, wherein the instructions, when executed by one or more processors, cause the one or more processors further to determine, based on the sensor data, an identity of an entity using the energy present in the frequency band.

4. The device as claim 1 recites, when executed by one or more processors, cause the one or more processors further to determine, based on the sensor data, a noise level associated with the frequency band.

5. The device as claim 1 recites, when executed by one or more processors, cause the one or more processors further to determine, based on the sensor data, a power level associated with a battery of the device.

6. The device as claim 5 recites, when executed by one or more processors, cause the one or more processors further to determine a temporal frequency for scanning the frequency band based on the power level associated with the battery of the device.

7. The device as claim 5 recites, when executed by one or more processors, cause the one or more processors further to:
determine that the power level is below a threshold power level; and
send an indication to the base station indicating that the power level is below the threshold power level.

8. The device as claim 1 recites, when executed by one or more processors, cause the one or more processors further to:
determine at least one of a time, a day, or a geolocation associated with the device; and
determine a temporal frequency for scanning at least the portion of the frequency band based at least in part on at least one of the time, the day, or the geolocation associated with the device.

9. The device as claim 1 recites, wherein the frequency band is associated with a plurality of channels, and when executed by one or more processors, cause the one or more processors further to:
determine, based at least in part on historical data, a likelihood that one or more channels of the plurality of channels are occupied by one or more priority users; and
determine that the likelihood is greater than a threshold, wherein the portion of the frequency band excludes the one or more channels.

10. A computer-implemented method comprising:
scanning, using a sensor associated with a device, at least a portion of a frequency band associated with Citizens Broadband Radio Service to generate sensor data indicating at least energy present in the portion of the frequency band, the sensor being configured to operate in the frequency band; and
transmitting the sensor data to a base station, the base station configured to analyze the sensor data and determine how to transmit one or more communications within the frequency band based at least in part on the sensor data and subscriber information associated with one or more subscribers of a telecommunications service.

11. The computer-implemented method as claim 10 recites, wherein scanning at least the portion of the frequency band comprises scanning a first channel of a plurality of channels associated with the frequency band at a first time and scanning a second channel of the plurality of channels at a second time after the first time.

12. The computer-implemented method as claim 10 recites, wherein scanning at least the portion of the frequency band comprises scanning each channel of a plurality of channels associated with the frequency band at a substantially same time.

13. The computer-implemented method as claim 10 recites, further comprising:
determining, based at least in part on the sensor data, a power level associated with a battery of the device; and
determining a temporal frequency for scanning the frequency band based on the power level associated with the battery of the device.

14. The computer-implemented method as claim 10 recites, further comprising:
determining, based at least in part on the sensor data, a power level associated with a battery of the device;
determining that the power level is below a threshold power level; and
sending an indication to the base station indicating that the power level is below the threshold power level.

15. The computer-implemented method as claim 10 recites, further comprising:
determining at least one of a time, a day, or a geolocation associated with the device; and
determining a temporal frequency for scanning at least the portion of the frequency band based at least in part on at least one of the time, the day, or the geolocation associated with the device.

16. The computer-implemented method as claim 10 recites, wherein the frequency band is associated with a plurality of channels, and the method further comprises:
determining, based at least in part on historical data, a likelihood that one or more channels of the plurality of channels are occupied by one or more priority users; and determining that the likelihood is greater than a threshold, wherein the portion of the frequency band excludes the one or more channels.

17. One or more non-transitory computer-readable media associated with a device, the one or more computer-readable media storing instructions executable by one or more processors, wherein the instructions, when executed by the one or more processors, cause the one or more processors to:
  send, to a sensor associated with the device, an instruction to scan at least a portion of a Citizens Broadband Radio Service (CBRS) band to generate sensor data indicating at least energy present in the portion of a frequency band, the sensor being configured to operate in the frequency band; and
  transmit the sensor data to a base station, the base station configured to analyze the sensor data and determine how to transmit one or more communications within the frequency band based at least in part on the sensor data and subscriber information associated with one or more subscribers of a telecommunications service.

18. The one or more non-transitory computer-readable media as claim 17 recites, wherein the instructions, when executed by the one or more processors, cause the one or more processors further to:
  determine a power level associated with a battery of the device; and
  determine a timing for sending the instruction based at least in part on the power level associated with the battery of the device.

19. The one or more non-transitory computer-readable media as claim 17 recites, wherein the instructions, when executed by the one or more processors, cause the one or more processors further to:
  determine at least one of a time, a day, or a geolocation associated with the device; and
  determine a timing for sending the instruction based at least in part on at least one of the time, the day, or the geolocation associated with the device.

20. The one or more non-transitory computer-readable media as claim 17 recites, wherein the frequency band is associated with a plurality of channels, and wherein the instructions, when executed by the one or more processors, cause the one or more processors further to:
  determine, based at least in part on historical data, a likelihood that one or more channels of the plurality of channels are occupied by one or more priority users; and
  determine that the likelihood is greater than a threshold, wherein the portion of the frequency band excludes the one or more channels.

* * * * *